(12) United States Patent
Osuki et al.

(10) Patent No.: US 7,951,469 B2
(45) Date of Patent: May 31, 2011

(54) WELDING MATERIAL AND WELDED JOINT STRUCTURE

(75) Inventors: Takahiro Osuki, Nishinomiya (JP); Kazuhiro Ogawa, Nishinomiya (JP); Hirokazu Okada, Kobe (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 0 days.

(21) Appl. No.: 12/691,859

(22) Filed: Jan. 22, 2010

(65) Prior Publication Data

US 2010/0136361 A1    Jun. 3, 2010

Related U.S. Application Data

(63) Continuation of application No. PCT/JP2009/051041, filed on Jan. 23, 2009.

(30) Foreign Application Priority Data

Jan. 25, 2008    (JP) .................................. 2008-014522
Nov. 14, 2008    (JP) .................................. 2008-291690

(51) Int. Cl.
*B32B 15/18*    (2006.01)
*C22C 38/56*    (2006.01)

(52) U.S. Cl. ............. 428/683; 428/685; 420/44; 420/11

(58) Field of Classification Search .................. None
See application file for complete search history.

(56) References Cited

U.S. PATENT DOCUMENTS

2007/0187379 A1*    8/2007    Osuki et al. ........... 219/137 WM
2010/0062279 A1*    3/2010    Osuki et al. ................. 428/683

FOREIGN PATENT DOCUMENTS

| JP | 37-17113 | 10/1937 |
|---|---|---|
| JP | 61-103698 | 5/1986 |
| JP | 62-243742 | 10/1987 |
| JP | 62-243743 | 10/1987 |
| JP | 62-267454 | 11/1987 |
| JP | 7-60481 | 3/1995 |

(Continued)

OTHER PUBLICATIONS

Machine translation of JP 2004-058062. Feb. 26, 2004.*
Y. Arata et al., "Solidification Crack Susceptibility in Weld Metals of Fully Austenitic Stainless Steels (Report II)", *Transactions of JWRI* vol. 6-1 (1977), p. 105-116.

*Primary Examiner* — John J Zimmerman
(74) *Attorney, Agent, or Firm* — Clark & Brody

(57) ABSTRACT

A welding material, to be used for welding a base metal made of an austenitic alloy comprising $C \leq 2.0\%$, $Si \leq 4.0\%$, Mn: 0.01 to 3.0%, P: more than 0.03% to not more 0.3%, $S \leq 0.03\%$, Cr: 12 to 35%, Ni: 6 to 80%, sol. Al: 0.001 to 1% and $N \leq 0.3\%$, with the balance being Fe and impurities to a base metal made of another austenitic alloy, which comprises C: more than 0.3% to 3.0%, $Si \leq 4.0\%$, $Mn \leq 3.0\%$, $P \leq 0.03\%$, $S \leq 0.03\%$, Cr: more than 22% to 55%, Ni: more than 30% to not more than 70%, sol. Al: 0.001 to 1% and $N \leq 0.3\%$, with the balance being Fe and impurities can suppress the weld solidification cracking which occurs in an austenitic alloy having a high P content and showing fully austenitic solidification. Therefore, the said welding material can be widely used in such fields where a welding fabrication is required. The said welding material may contain a specific amount or amounts of one or more elements selected from Cu, Mo, W, V, Nb, Ti, Ta, Zr, Hf, Co, B, Ca, Mg and REM.

18 Claims, 1 Drawing Sheet

FOREIGN PATENT DOCUMENTS

| | | |
|---|---|---|
| JP | 9-52194 | 2/1997 |
| JP | 9-300096 | 11/1997 |
| JP | 11-285890 | 10/1999 |
| JP | 2001-18089 | 1/2001 |
| JP | 2004-58062 | 2/2004 |
| JP | 2006-45597 | 2/2006 |
| JP | 2007-186727 | 7/2007 |
| JP | 2007-186728 | 7/2007 |
| WO | 2006/106944 | 10/2006 |
| WO | 2008/013223 | 1/2008 |

* cited by examiner

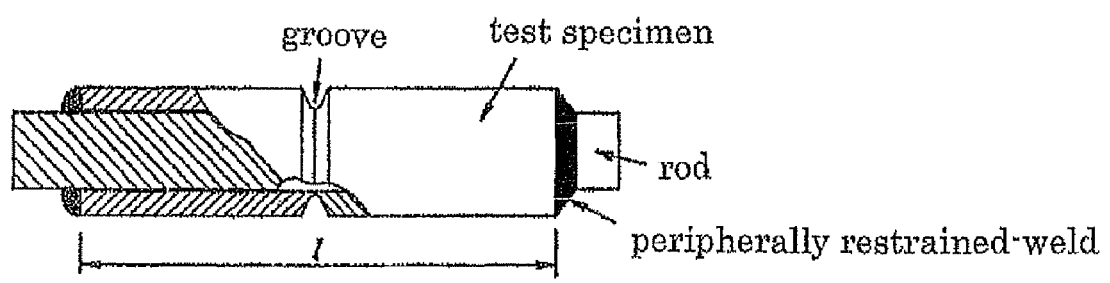

WELDING MATERIAL AND WELDED JOINT STRUCTURE

This application is a continuation of International Patent Application No. PCT/JP2009/051041, filed Jan. 23, 2009. This PCT application was not in English as published under PCT Article 21(2).

TECHNICAL FIELD

The present invention relates to a welding material and a welded joint structure. Particularly, it relates to a welding material to be used in welding austenitic alloys and to an austenitic alloy welded joint structure. More particularly, the present invention relates to a welding material which can be used in welding both austenitic alloys having a high P content or, further, in welding two austenitic alloys, different in kind, namely an austenitic alloy having a high P content and an austenitic alloy having a low P content (hereinafter also referred to as "dissimilar material welding") and which is excellent in weld solidification cracking resistance. The present invention also relates to a welded joint structure which can be widely applied to a steel pipe or steel plate and so on in which fields where creep strength and corrosion resistance are required and which is excellent in weld solidification cracking resistance or not only in weld solidification cracking resistance but also in ductility.

BACKGROUND ART

Austenitic stainless steels, for example, such as SUS 304, SUS 316 and SUS 310S and others, which are regulated in JIS G 4304 (2005), are known to be materials containing Cr and Ni as main elements and also excellent in corrosion resistance.

And, it is known that when austenitic steels contain P, which is essentially an impurity element, at high concentration levels, P contributes toward precipitation hardening by making $M_{23}C_6$ carbides finer, hence lead to improvements in high temperature strength characteristics, typically creep strength, as shown in the Patent Documents 1 to 4.

Similarly, the Patent Document 5 proposes an austenitic stainless steel markedly improved in high temperature strength characteristics, typically creep strength, as a result of its containing P at a high concentration level.

The Patent Document 6 and the Patent Document 7 disclose metallic materials which contain P at a level of exceeding 0.05% and contribute improvements in the metal dusting resistance of base metals.

The Patent Document 8 also discloses a welded joint and a welding material which is excellent in metal dusting resistance and is reduced in susceptibility to weld solidification cracking as a result of their containing Ti, at an appropriate level, which is based on a relationship between the contents of Si and Cu.

Further, the Patent Document 9 discloses, as a welding material for austenitic alloys, a welding material for a gas shielded arc welding which is reduced in susceptibility to solidification cracking by imposing the following restrictions on the contents of P and S as impurities: "P: not more than 0.01% and P+S: not more than 0.02%". The Patent Document 10 discloses a method of welding high Cr and high Ni alloy members while inhibiting weld solidification cracking in which the method comprises using a welding material containing Nb in addition to the composition of the base metal members.

The Patent Document 11 discloses a high C and a high Cr-high Ni type welding material which is so constituted that a Cr—Ni containing alloy plate suitable for wire drawing is used as a sheath material, in which a high C and high Cr alloy powder is covered to form a base wire material.

Further, the Patent Document 12 discloses a welded joint, excellent in resistance to high temperature cracking in welding, and characterized in that the weld metal satisfies two formulas. The quantity of the inclusions, which include P, the weld metal is regulated to 0.01 to 0.1% in terms of the area ratio so that the problem of hot cracking encountered in the dissimilar material welding of SUS 304 to invar alloy (36 Ni and the balance is Fe) may be overcome.

However, since P is hardly soluble in the austenite, P causes marked increases in the susceptibility to weld solidification cracking to a larger extent, not only in the case that a primary crystal austenite solidification occurs but also particularly in the case that a fully austenitic solidification occurs.

The said weld solidification cracking occurs when the liquid phase, which exists among dendrites during weld solidification and remains in a filmy form in low temperature regions, and cannot withstand the applied stress.

An increased P content results in an increase in the susceptibility to weld solidification cracking. This is due to P being markedly concentrated in the liquid phase during solidification and therefore greatly lowers the solidification completion temperature of the liquid phase and thus the liquid phase remains in low temperature regions. Therefore, for example in the Non-Patent Document 1, it is shown that the P content should be rigidly restricted.

Consequently, in the present state of affairs, the restraints are imposed on the P content in stainless steels and Ni based alloys which show fully austenitic solidification. For example, in the case of SUS 310S which is a steel species representative of the above-mentioned austenitic stainless steels, shows the fully austenitic solidification and is regulated in JIS G 4304 (2005), the content of P is restricted to not more than 0.045%. The welding material to be used in welding the said SUS 310S, the content of P is restricted to a lower level, that is to say, not more than 0.030%, in JIS G 4316 (1991) from the viewpoint of the said weld solidification cracking.

That is to say, in spite of the fact that P is so far known to produce favorable effects on the characteristics of austenitic steels, improving high temperature strength, typically creep strength, and improving corrosion resistance and so on, the content thereof has so far been restricted since it markedly increases their susceptibility to weld solidification cracking.

Patent Document 1: JP 37-17113 A
Patent Document 2: JP 62-243742 A
Patent Document 3: JP 62-243743 A
Patent Document 4: JP 62-267454 A
Patent Document 5: WO 2006/106944
Patent Document 6: JP 2007-186727 A
Patent Document 7: JP 2007-186728 A
Patent Document 8: JP 2006-45597 A
Patent Document 9: JP 7-60481 A
Patent Document 10: JP 9-52194 A
Patent Document 11: JP 11-285890 A
Patent Document 12: JP 2001-18089 A
Non-Patent Document 1: Y. Arata, F. Matsuda and S. Katayama: Transactions of JWRI, Vo. 6-1 (1977), pp. 105 to 116

DISCLOSURE OF THE INVENTION

Problems to be Solved by the Invention

As for the invention disclosed in the above-mentioned Patent Document 1, there is no description of the marked increase in the susceptibility to weld solidification cracking due to an excessive content of P. Therefore, it is very difficult to use the steel disclosed therein as a steel which is required to be welded.

As for the inventions disclosed in the Patent Documents 2 to 4 as well, P is added only to produce improving effects of high temperature characteristics and, although the malignant influence of an excessive addition of P is described, there is no description at all of any technique for reducing the susceptibility to the weld solidification cracking of austenitic stainless steels which show the fully austenitic solidification in the stage that the austenite solidifies as a primary crystal.

In the Patent Document 5, the weldability of base metals in the Varestraint test is taken into consideration, but no welding material and welded joint structure is considered.

In the Patent Document 6 and the Patent Document 7, there is no consideration to a marked increase in the susceptibility to solidification cracking on the occasion of welding resulting from an increase in P content. In the Patent Document 8 as well, only the results of investigations at the conventional low P content levels are disclosed.

The inventions disclosed in the Patent Document 9 and the Patent Document 10 are not directed to welding materials for welding metallic materials which contain high P concentrations. The base metal which is disclosed in the example of the Patent Document 11 has a low and insignificant P content.

In the example of the Patent Document 12, there are shown only the results of the welding of alloys which mutually have identical compositions and, further, weld cracking is inhibited only in the case where austenitic alloys, having an alloy composition containing P at a content level of at most 0.030%, are used.

As described above, in all the Patent Documents 1 to 12, there is no consideration for welding materials and welded joint structures which are capable of inhibiting weld cracking in welding using alloys which have a high P content as base metals.

In the actual welding fabrication, not only welding using austenitic alloys having a high P content as base metals but also dissimilar material welding using materials differing in composition, for example, an austenitic alloy having a high P content and an austenitic alloy having a low P content as base metals is anticipated. However, in any of the above-mentioned Patent Documents 1 to 12, such dissimilar material welding is not considered.

P is an element which can improve high temperature strength characteristics, in particular creep strength, and corrosion resistance. Therefore, if a technique is obtained by which the susceptibility to weld solidification cracking of austenitic alloys which show the fully austenitic solidification on the occasion of welding can be reduced, such a technique will be expected to contribute toward developing austenitic alloys, which are economically advantageous and high functional, by utilizing P which is an inexpensive element.

Further, from the viewpoint of the welded joint structure, it often becomes necessary for the weld metal to reliably have ductility as a performance characteristic of the welded portion. This is due to, when the weld metal has a very hard microstructure and is low in ductility, a bending fabrication may cause a rupture during the treatment, rendering it difficult to use the welded structure for its intended use, even if no solidification cracking is observed.

The present invention has been accomplished in view of the above-mentioned state of affairs. It is an objective of the present invention to improve the weldability of austenitic alloys which have a high P content and also show fully austenitic solidification (in other words, austenitic alloys which have a fully austenitic microstructure), in particular to reduce the susceptibility of those alloys to weld solidification cracking, which is the most important problem they may encounter. More specifically, the objective of the present invention is to provide a welding material for welding austenitic alloys which enables welding with excellent weld solidification cracking resistance, even when at least one of the base metal austenitic alloys to be welded has a high P content and also shows fully austenitic solidification, as well as the austenitic alloy welded joint structure resulting from welding of austenitic alloy base metals using the said welding material.

Another objective of the present invention is to provide an austenitic alloy welded joint structure as mentioned above which not only reduces the susceptibility to weld solidification cracking but also has excellent ductility.

Means for Solving the Problems

As already mentioned hereinabove, in spite of the fact that P is so far known to produce favorable effects on the characteristics of austenitic steels, improving high temperature strength, typically creep strength, and improving corrosion resistance and so on, the content thereof has so far been restricted since it markedly increases their susceptibility to weld solidification cracking.

On the occasion of welding of such austenitic alloys containing a high concentration of P as base metals, even if the welding is carried out using a welding material having a low P content, the ratio of dilution from the base metals is high in the weld metal of the primary layer. Therefore, P in the base metals flows into the weld metal, causing the P content therein to arrive at a level exceeding the upper limit of 0.03% for ordinary materials, with the result that the occurrence of solidification cracking in the weld metal can hardly be avoided.

Therefore, the present inventors made various investigations in search of a technique for reducing the susceptibility to weld solidification cracking and also a technique for causing the weld metal to ensure high ductility on the occasion of the so-called "similar material welding" using, as base metals, alloys containing P in similarly high concentrations and showing the fully austenitic solidification as well as on the occasion of "dissimilar material welding" using, as base metals, alloys differing in P content. As a result, the following findings (a) to (j) were obtained.

(a) When austenitic alloys having a high P content are welded together, P is concentrated in the liquid phase of a single-layer welding or at least the primary layer in a multi-layer welding where the ratio of dilution from the base metals is high and, as a result, the susceptibility to solidification cracking is increased.

(b) In the case of dissimilar material welding, that is to say, in the case of the welding of the austenitic alloy having a P content restricted to a level for ordinary steel materials, namely 0.03% or below, to another base metal having a high P content, P flows into the weld metal to increase the P concentration in the liquid phase and, in the weld metal of the primary layer, in particular, the susceptibility to weld solidification cracking increases compared with the case where materials each having an ordinary P content level are welded together.

(c) When the C content in the weld metal is increased and, at the same time, a high Cr content not less than a specific level is secured, the "$M_7C_3$" type eutectic carbides, which are stable at high temperatures during weld solidification can be effectively utilized to promote the reduction of the entropy of the system and, thus, the progress of solidification can be accelerated.

(d) Even when the susceptibility to weld solidification cracking is increased due to an increase in the P concentration in the liquid phase on the occasion of similar or dissimilar material welding, using an alloy or alloys having a high P content, as mentioned above under (a) and (b); if the progress of solidification is thermodynamically accelerated, the time in a region in which a small amount of liquid phase, which is low in ductility and serves as a starting point for solidification cracking remains is shortened and, as a result, solidification cracking is inhibited.

(e) Therefore, in order to counteract the malignant influence of an increase in the P content in the weld metal caused by the flowing of P from the base metal, it is desirable to use a welding material having a high C content and a high Cr content.

(f) In the case of a single-layer welding or the primary layer of a multi-layer welding, the ratio of dilution from base metals is high, as mentioned above under (a). Accordingly, when the P content in the base metal is high, P flows into the weld metal to cause an increase in P concentration in the liquid phase, so that the susceptibility to weld solidification cracking increases as compared with the welding of ordinary P content, that is not more than 0.03%. Therefore, weld solidification cracking can be inhibited by using a welding material having a high C content and a high Cr content, at least in the primary layer, and selecting the welding conditions so that at least the weld metal of the primary layer may have a composition within a specific range. Furthermore, the level of strength required for the welded joint structure can be secured and a sound bead shape can be obtained by selecting the penetration bead height in a specific range.

(g) On the other hand, when a welded joint structure is built up by carrying out a single-layer welding or a multi-layer welding, using a welding material having an excessively high C content, coarse eutectic carbides, which are low in ductility crystallize out in excess in the weld metal and the elongation and the reduction of area of the weld metal are markedly reduced, therefore excellent ductility cannot be ensured.

(h) Therefore, in the case of creating welded joint structures by a multi-layer welding, in particular, the use of a high-Cr welding material containing C at a level which exceeds 0.6%, at least in the primary pass of the multi-layer welding, makes it easy to suppress the weld solidification cracking. In the second and subsequent build-up passes of the multi-layer welding, the amount of P flowing into the weld metal is relatively suppressed. Therefore, the use of a high-Cr welding material having a C content lowered compared with the occasion in the primary pass welding, namely a C content of more than 0.2% to not more than 0.6%, makes it possible to reduce the amount of eutectic carbides crystallizing out and thereby bring about improvements in ductility. Accordingly, when the primary pass welding and the subsequent build-up passes of the multi-layer welding are carried out in the manner mentioned above, the weld solidification cracking, not only in the primary pass of the multi-layer welding but also in the subsequent build-up passes thereof can be inhibited. Further, welded joint structures having excellent ductility can be obtained.

(i) On the other hand, when the primary pass welding is carried out under welding conditions in which the ratio of dilution from the base metals is less than 50%, the amount of P flowing into the weld metal is suppressed. Therefore, even when a high-Cr welding material with a lowered C content, namely a C content of more than 0.2% to not more than 0.6%, is used under such welding conditions as mentioned above, it becomes possible to inhibit the occurrence of weld solidification cracking and provide welded joint structures which have reliable excellent ductility.

(j) In the case of producing welded joint structures by a multi-layer welding; if the welding is carried out, at least in the primary pass welding, under welding fabrication conditions in which the ratio of dilution from the base metals is lower than 50%, and the amount of P flowing into the weld metal in the primary layer is reduced, compared with the case (g) mentioned above. Therefore, if the welding of all layers, inclusive of the primary layer, is carried out using a high-Cr welding material having a C content of more than 0.2% to not more than 0.6%, the amount of eutectic carbides crystallizing out can be reduced and improvements in ductility can be brought about. And, in this case, not only the weld solidification cracking in the primary pass of the multi-layer welding can be prevented by the control of the ratio of dilution from the base metals but also the weld solidification cracking in the subsequent build-up passes thereof can be inhibited and, further, welded joint structures having excellent ductility can be obtained.

The present invention has been accomplished on the basis of the above-described findings. The main points of the present invention are the welding materials shown in the following (1) to (3), and the welded joint structures shown in the following (4) to (12).

(1) A welding material to be used for welding a base metal made of an austenitic alloy having the following "chemical composition 1" to a base metal made of another austenitic alloy, comprising:

by mass percent, C: more than 0.3% to not more than 3.0%, Si: not more than 4.0%, Mn: not more than 3.0%, P: not more than 0.03%, S: not more than 0.03%, Cr: more than 22% to not more than 55%, Ni: more than 30% to not more than 70%, sol. Al: 0.001 to 1% and N: not more than 0.3%, with the balance being Fe and impurities:

"Chemical composition 1": A chemical composition which comprises, by mass percent, C: not more than 2.0%, Si: not more than 4.0%, Mn: 0.01 to 3.0%, P: more than 0.03% to not more than 0.3%, S: not more than 0.03%, Cr: 12 to 35%, Ni: 6 to 80%, sol. Al: 0.001 to 5% and N: not more than 0.3%, with the balance being Fe and impurities.

(2) The welding material according to the above (1), in which the base metal made of the another austenitic alloy has the following "chemical composition 1 or 2":

"Chemical composition 1": A chemical composition which comprises, by mass percent, C: not more than 2.0%, Si: not more than 4.0%, Mn: 0.01 to 3.0%, P: more than 0.03% to not more than 0.3%, S: not more than 0.03%, Cr: 12 to 35%, Ni: 6 to 80%, sol. Al: 0.001 to 5% and N: not more than 0.3%, with the balance being Fe and impurities:

"Chemical composition 2": A chemical composition which comprises, by mass percent, C: not more than 2.0%, Si: not more than 4.0%, Mn: 0.01 to 3.0%, P: not more than 0.03%, 5: not more than 0.03%, Cr: 12 to 35%, Ni: 6 to 80%, sol. Al: 0.001 to 5% and N: not more than 0.3%, with the balance being Fe and impurities.

(3) The welding material according to the above (1) or (2), in which one or more alloys among the base metals and welding material contain one or more elements selected from the first group and the second group or both given below in lieu of a part of Fe, by mass percent:

First group: Cu: not more than 5%, Mo: not more than 10%, W: not more than 10%, V not more than 2%, Nb: not more than 3%, Ti: not more than 3%, Ta: not more than 8%, Zr: not more than 1%, Hf: not more than 1%, Co: not more than 15% and B: not more than 0.03%; and Second group: Ca: not more than 0.05%, Mg: not more than 0.05% and REM: not more than 0.3%.

(4) A welded joint structure in which the base metal according to any one of the above (1) to (3) is welded by using the welding material according to any one of the above (1) to (3).

(5) A welded joint structure which is constructed with base metals each made of an austenitic alloy comprising, by mass percent, C: not more than 2.0%, Si: not more than 4.0%, Mn: 0.01 to 3.0%, P: more than 0.03% to not more than 0.3%, 5: not more than 0.03%, Cr: 12 to 35%, Ni: 6 to 80%, sol. Al: 0.001 to 5% and N: not more than 0.3%, with the balance being Fe and impurities, and a weld metal made of an austenitic alloy having the following characteristics (i) and (ii):

(i) the chemical composition of at least the primary layer being welded from one side, comprises, by mass percent, C: more than 0.1% to not more than 0.7%, Si: not more than 4.0%, Mn: not more than 3.0%, P: more than 0.03% to not more than 0.1%, 5: not more than 0.03%, Cr: 18 to 30%, Ni: more than 10% to not more than 70%, sol. Al: 0.001 to 1% and N: not more than 0.3%, with the balance being Fe and impurities; and (ii) the penetration bead has a height of 0 to 3 mm.

(6) The welded joint structure according to the above (5), in which one or more alloys among the base metals and weld metal contain one or more elements selected from the first group and the second group or both given below in lieu of a part of Fe, by mass percent:

First group: Cu: not more than 5%, Mo: not more than 10%, W: not more than 10%, V: not more than 2%, Nb: not more than 3%, Ti: not more than 3%, Ta: not more than 8%, Zr: not more than 1%, Hf: not more than 1%, Co: not more than 15% and B: not more than 0.03%; and Second group: Ca: not more than 0.05%, Mg: not more than 0.05% and REM: not more than 0.3%.

(7) A welded joint structure resulting from welding of a base metal made of an austenitic alloy having the following "chemical composition 1" to a base metal made of another austenitic alloy, on the occasion of welding, a welding material which comprises, by mass percent, C: more than 0.6% to not more than 2.0%, Si: not more than 4.0%, Mn: not more than 3.0%, P: not more than 0.03%, S: not more than 0.03%, Cr: more than 22% to not more than 35%, Ni: more than 30% to not more than 70%, sol. Al: 0.001 to 1% and N: not more than 0.3%, with the balance being Fe and impurities, is used in the primary pass of the multi-layer welding and a welding material which comprises, by mass percent, C: more than 0.2% to not more than 0.6%, Si: not more than 4.0%, Mn: not more than 3.0%, P: not more than 0.03%, S: not more than 0.03%, Cr: more than 22% to not more than 35%, Ni: more than 30% to not more than 70%, sol. Al: 0.001 to 1% and N: not more than 0.3%, with the balance being Fe and impurities, is used in the subsequent build-up passes of the said multi-layer welding:

"Chemical composition 1": A chemical composition which comprises, by mass percent, C: not more than 2.0%, Si: not more than 4.0%, Mn: 0.01 to 3.0%, P: more than 0.03% to not more than 0.3%, S: not more than 0.03%, Cr: 12 to 35%, Ni: 6 to 80%, sol. Al: 0.001 to 5% and N: not more than 0.3%, with the balance being Fe and impurities.

(8) The welded joint structure according to the above (7), in which the base metal made of the another austenitic alloy has the following "chemical composition 1 or 2":

"Chemical composition 1": A chemical composition which comprises, by mass percent, C: not more than 2.0%, Si: not more than 4.0%, Mn: 0.01 to 3.0%, P: more than 0.03% to not more than 0.3%, S: not more than 0.03%, Cr: 12 to 35%, Ni: 6 to 80%, sol. Al: 0.001 to 5% and N: not more than 0.3%, with the balance being Fe and impurities:

"Chemical composition 2": A chemical composition which comprises, by mass percent, C: not more than 2.0%, Si: not more than 4.0%, Mn: 0.01 to 3.0%, P: not more than 0.03%, S: not more than 0.03%, Cr: 12 to 35%, Ni: 6 to 80%, sol. Al: 0.001 to 5% and N: not more than 0.3%, with the balance being Fe and impurities.

(9) The welded joint structure according to the above (7) or (8), in which one or more alloys among the base metals and welding material contain one or more elements selected from the first group and the second group or both given below in lieu of a part of Fe, by mass percent:

First group: Cu: not more than 5%, Mo: not more than 10%, W: not more than 10%, V: not more than 2%, Nb: not more than 3%, Ti: not more than 3%, Ta: not more than 8%, Zr: not more than 1%, Hf: not more than 1%, Co: not more than 15% and B: not more than 0.03%; and Second group: Ca: not more than 0.05%, Mg: not more than 0.05% and REM: not more than 0.3%.

(10) A welded joint structure resulting from welding of a base metal made of an austenitic alloy having the following "chemical composition 1" to a base metal made of another austenitic alloy, on the occasion of welding, using a welding material which comprises by mass percent, C: more than 0.2% to not more than 0.6%, Si: not more than 4.0%, Mn: not more than 3.0%, P: not more than 0.03%, S: not more than 0.03%, Cr: more than 22% to not more than 35%, Ni: more than 30% to not more than 70%, sol. Al: 0.001 to 1% and N: not more than 0.3%, with the balance being Fe and impurities, at least the welding of the primary layer is carried out under a condition such that the ratio of dilution from the base metals becomes less than 50%:

"Chemical composition 1": A chemical composition which comprises, by mass percent, C: not more than 2.0%, Si: not more than 4.0%, Mn: 0.01 to 3.0%, P; more than 0.03% to not more than 0.3%, S: not more than 0.03%, Cr: 12 to 35%, Ni: 6 to 80%, sol. Al: 0.001 to 5% and N: not more than 0.3%, with the balance being Fe and impurities.

(11) The welded joint structure according to the above (10), in which the base metal made of the another austenitic alloy has the following "chemical composition 1 or 2":

"Chemical composition 1": A chemical composition which comprises, by mass percent, C: not more than 2.0%, Si: not more than 4.0%, Mn: 0.01 to 3.0%, P: more than 0.03% to not more than 0.3%, S: not more than 0.03%, Cr: 12 to 35%, Ni: 6 to 80%, sol. Al: 0.001 to 5% and N: not more than 0.3%, with the balance being Fe and impurities:

"Chemical composition 2": A chemical composition which comprises, by mass percent, C: not more than 2.0%, Si: not more than 4.0%, Mn: 0.01 to 3.0%, P: not more than 0.03%, S: not more than 0.03%, Cr: 12 to 35%, Ni: 6 to 80%, sol. Al: 0.001 to 5% and N: not more than 0.3%, with the balance being Fe and impurities.

(12) The welded joint structure according to the above (10) or (11), in which one or more alloys among the base metals and welding material contain one or more elements selected from the first group and the second group or both given below in lieu of a part of Fe, by mass percent:

First group: Cu: not more than 5%, Mo: not more than 10%, W: not more than 10%, V: not more than 2%, Nb: not more than 3%, Ti: not more than 3%, Ta: not more than 8%, Zr: not more than 1%, Hf: not more than 1%, Co: not more than 15% and B: not more than 0.03%; and Second group: Ca: not more than 0.05%, Mg: not more than 0.05% and REM: not more than 0.3%.

The term "impurities" so referred to in the phrase "the balance being Fe and impurities" indicates those impurities which come from ores, scraps, other raw materials and so on in the industrial production of metallic materials.

The term "REM" refers to a total of 17 elements including Sc, Y and lanthanoid collectively, and the REM content mentioned above means the content of one element or the total content of two or more elements among the REM.

The term "ratio of dilution from base metals" refers to the proportion of the base metals diluted in the weld metal of the primary layer obtained by the combination of the base metals and welding material.

In the following, the above-mentioned inventions (1) to (3) related to the welding materials and the inventions (4) to (12) related to the welded joint structures are referred to as "the present invention (1)" to "the present invention (12)", respectively, or collectively referred to as "the present invention".

Effects of the Invention

The welding materials of the present invention, in spite of at least one of the base metals has a high P content of more than 0.03% to not more than 0.3% and shows fully austenitic solidification, can suppress weld solidification cracking; therefore, they can be widely used in such fields where a welding fabrication is required. Furthermore, the welded joint structures of the present invention, in spite of at least one of the base metals has a high P content mentioned above and shows fully austenitic solidification, are excellent in weld solidification cracking resistance or in both weld solidification cracking resistance and ductility. In addition, the welded joint structures of the present invention also have excellent high temperature strength and corrosion resistance. The welding materials of the present invention are best suited for producing the above-mentioned austenitic alloy welded joint structures.

BRIEF DESCRIPTION OF THE DRAWING

FIG. 1 is the illustration of a tubular material used in the restrained weld cracking test in the "Example 2".

BEST MODES FOR CARRYING OUT THE INVENTION

In the following, all of the requirements of the present invention are described in detail. In the following description, the symbol "%" for the content of each element means "% by mass".

(A) Chemical Compositions of the Base Metals, Welding Material and the Weld Metal in the Welded Joint Structure:

(A-1) Regarding C in the Welding Material:

(A-1-1) Regarding C in the Welding Material to be Used in the Present Inventions (1) and (2):

C: more than 0.3% to not more than 3.0%:

C is one of the most important elements in the welding material mentioned above. That is to say, C is an indispensable element in order to promote the crystallization of the Cr-based "$M_7C_3$" type carbides which are necessary for counteracting the malignant influence of an increased P content on the susceptibility to weld solidification cracking of austenitic alloys.

When, in welding austenitic alloys having a Cr content of not less than 12%, at least one of the base metals contains a high-P amount of more than 0.03%, that is to say, in the case of similar material welding of base metals containing a high concentration of P, or in the case of dissimilar material welding using base metals only one of which contains a high concentration of P, a C content of more than 0.3% is employed in order to stably inhibit the susceptibility to solidification cracking from increasing as a result of the concentration and inflow of P at a ratio of dilution from base metals of about 50%. A higher C content is more favorable; however, if the content of C is more than 3.0%, an excessive amount of C flows into the weld metal under certain welding conditions, often rendering the ductility of the welded joint very poor. Therefore, the content of C is set to more than 0.3% to not less than 3.0%. The C content of the above-mentioned welding material is preferably more than 0.5%, and more preferably not less than 0.8%.

(A-1-2) Regarding C in the Welding Material for the Primary Pass of the Multi-Layer Welding which is to be Used in the Present Invention (7):

C: more than 0.6% to not more than 2.0%:

C is one of the most important elements in the welding material mentioned above. That is to say, C is an indispensable element in order to promote the crystallization of the Cr-based "$M_7C_3$" type carbides which are necessary for counteracting the malignant influence of an increased P content on the susceptibility to weld solidification cracking of austenitic alloys.

When, in welding austenitic alloys having a Cr content of not less than 12%, at least one of the base metals contains a high-P amount of more than 0.03%, that is to say, in the case of the primary pass welding in similar material welding of base metals containing a high concentration of P, or in the case of the primary pass welding in dissimilar material welding using base metals only one of which contains a high concentration of P, a C content of more than 0.6% is employed for the welding material for the primary pass of the multi-layer welding in order to stably inhibit the susceptibility to solidification cracking from increasing as a result of the concentration and inflow of P at a ratio of dilution from base metals of not less than 50%, in particular. A higher C content is more favorable for the welding material for the primary pass of the multi-layer welding; however, if the content of C is more than 2.0%, coarse eutectic carbides crystallize and/or precipitate out in excessive amounts in the weld metal, rendering the ductility of the weld metal of the primary layer very poor. Therefore, the content of C in the welding material for the primary pass of the multi-layer welding is set to more than 0.6% to not less than 2.0%. The lower limit of the C in the welding material for the primary pass of the multi-layer welding mentioned above is preferably 0.8%, and more preferably 1.0%.

(A-1-3) Regarding C in the Welding Material for the Subsequent Build-Up Passes of the Multi-Layer Welding which is to be Used in the Present Invention (7):

C: more than 0.2% to not more than 0.6%:

Even when the ratio of dilution from base metals is not less than 50%, the amounts of P flowing into the weld metal from the primary pass welded portion and base metals in the second and subsequent build-up passes in the multilayer welding is small. Therefore, the C content of the above welding material for the subsequent build-up passes of the multi-layer welding may be relatively low, that is to say, not more than 0.6%. If a welding material containing C of more than 0.6% is singly used for the build-up passes of the multi-layer welding, the weld metal obtained may show reduced ductility. Therefore, in order to provide the welded joint structures with sufficient ductility, the C content of the above-mentioned welding material for the subsequent build-up passes of the multi-layer welding is set to not more than 0.6%. On the other hand, when the ratio of dilution from base metals is not less than 50% in particular, the concentration and inflow of P increase. Therefore, for inhibiting the susceptibility to weld solidification cracking in the subsequent build-up passes of the multi-layer welding from increasing, the C content of the above-mentioned welding material for the subsequent build-up passes of the multi-layer welding is set to more than 0.2%. The lower limit of the C content in the welding material for the subsequent build-up passes of the multi-layer welding mentioned above is preferably 0.25%, and more preferably 0.3%.

(A-1-4) Regarding C in the Welding Material to be Used in the Present invention (10);

C: more than 0.2% to not more than 0.6%:

When the ratio of dilution from base metals is less than 50%, at least in the primary layer, the concentration and inflow of P are small. Therefore, the C content of the welding material to be used in such a case is preferably lower, that is to say, not more than 0.6%; at such a C content level, it becomes possible to prevent the ductility of the resulting weld metal from decreasing and provide the welded joint structures with sufficient ductility. On the other hand, when the ratio of dilution from base metals is less than 50%, at least in the primary layer, the susceptibility to solidification cracking resulting from concentration and inflow of P can be stably prevented by employing a C content more than 0.2% for the above-mentioned welding material. Therefore, the C content of the above-mentioned welding material is set to more than 0.2% to not more than 0.6%. In cases where the ratio of dilution from base metals at least in the primary layer is less than 50%, the lower limit of the C content in the welding material is preferably 0.4% in the case of welding where the ratio of dilution from base metals is not less than 40% in particular; the lower limit of the C content in the welding material is preferably 0.3% in the case of welding where the ratio of dilution from base metals is not less than 30% in particular.

(A-2) Regarding Cr in the Welding Material:

(A-2-1) Regarding Cr in the Welding Material to be Used in the Present Inventions (1) and (2):

Cr: more than 22% to not more than 55%

Cr is an essential element for forming a thin oxide film on the surface of the metallic materials to thereby ensure stainless steels and Ni based alloys oxidation resistance, steam oxidation resistance and high temperature corrosion resistance and so on. In addition, like C, in the above-mentioned welding material, Cr is an indispensable element in order to crystallize the said "$M_7C_3$" type carbides.

When, in welding austenitic alloys having a Cr content of not less than 12%, at least one of the base metals contains a high-P amount of more than 0.03%, that is to say, in the case of similar material welding of base metals containing a high concentration of P, or in the case of dissimilar material welding using base metals only one of which contains a high concentration of P, the welding material is required to have a Cr content of more than 22% so as to stably inhibit the susceptibility to solidification cracking from increasing as a result of the concentration and inflow of P at a ratio of dilution from base metals of about 50%. However, if the content of Cr is more than 55%, it becomes very difficult, in view of the balance with the Ni content, to ensure the stability of a fully austenitic microstructure which is necessary for securing creep strength for a long period of time and, in addition, coarse carbides precipitate out in large amounts; thus marked deterioration of mechanical properties, for example agetoughness and so on, sometimes occur. Therefore, the content of Cr is set to more than 22% to not more than 55%. The Cr content of the above-mentioned welding material is more preferably less than 40%.

(A-2-2) Regarding Cr in the Welding Material for the Primary Pass and the Subsequent Build-Up Passes of the Multi-Layer Welding which are to be Used in the Present Invention (7), and in the Welding Material to be Used in the Present Invention (10):

Cr: more than 22% to not more than 35%

As mentioned above, Cr is an essential element for forming a thin oxide film on the surface of the metallic materials to thereby ensure stainless steels and Ni based alloys oxidation resistance, steam oxidation resistance and high temperature corrosion resistance and so on. In addition, like C, in the above-mentioned welding materials as well, Cr is an indispensable element in order to crystallize the said "$M_7C_3$" type carbides.

When, in welding austenitic alloys having a Cr content of not less than 12%, at least one of the base metals contains a high-P amount of more than 0.03%, that is to say, in the case of similar material welding of base metals containing a high concentration of P or in the case of dissimilar material welding using base metals only one of which contains a high concentration of P, the welding material is required to have a Cr content of more than 22% so as to stably inhibit the susceptibility to solidification cracking from increasing as a result of the concentration and inflow of P at a ratio of dilution from base metals of not less than 50%. Similarly, also when the ratio of dilution from base metals at least in the primary layer is less than 50%, the welding material is required to have a Cr content of more than 22% so as to stably inhibit the susceptibility to solidification cracking from increasing as a result of the concentration and inflow of P.

However, in both the case where the ratio of dilution from base metals is not less than 50% and the case where the ratio of dilution from base metals at least in the primary layer is less than 50%, a Cr content of more than 35% may deteriorate the ductility of the weld metal as a result of crystallizing of coarse eutectic carbides in excessive amounts. Therefore, the content of Cr in the welding materials mentioned above is set to more than 22% to not more than 35%. The Cr content of the welding materials mentioned above is more preferably not more than 33%.

(A-3) Regarding Elements Other than C and Cr in the Welding Material:

(A-3-1) Regarding Elements Other than C and Cr in the Welding Material to be Used in the Present Inventions (1), (7) and (10):

Si: not more than 4.0%

Si is an element which reacts with O (oxygen) coming from the air on the occasion of welding to thereby produce a deoxidizing effect and further is effective in increasing oxidation resistance, steam oxidation resistance and so on of the resulting weld metal. In order to obtain the above-mentioned effects, it is preferable to contain a Si content of not less than 0.1%. However, when the content of Si becomes excessive, in particular when it exceeds 4.0%, the susceptibility to weld solidification cracking markedly increases. Therefore, the content of Si is set to not more than 4.0%. The content of Si is more preferably not more than 3.0% and further more preferably not more than 2.0%.

Mn: not more than 3.0%

Mn is an element effective in preventing hot working brittleness due to the S which is contained as an impurity in the metallic materials and, in addition, Mn is effective in deoxidation on the occasion of melting the materials. In order to obtain these effects, a Mn content of not less than 0.01% is preferable. However, if the content of Mn exceeds 3.0%, it promotes the precipitation of such intermetallic compounds as the a phase and so on; thus a decrease in toughness and/or ductility due to the deterioration of microstructural stability at high temperatures occurs. Therefore, the content of Mn is set to not more than 3.0%. The content of Mn is more preferably 0.10 to 2.0% and further more preferably 0.30 to 1.5%.

P: not more than 0.03%

P is conventionally known to be an element which markedly increases the susceptibility to weld solidification cracking. In the case of the fully austenitic solidification, in particular, the said malignant influence markedly increases. In the present invention, although the P content of the austenitic alloy which constructs at least one of the base metals is increased in order to ensure high temperature strength and corrosion resistance, the P content of the welding material is set to not more than 0.03% in order to reduce the susceptibility to weld solidification cracking and also in order to suppress the P content in the weld metal. The content of P is more preferably not more than 0.02%, and further more preferably not more than 0.01%.

S: not more than 0.03%

S is an impurity element coming from raw materials, for example, in the step of melting the metallic materials. A high content of S causes the deterioration of corrosion resistance and it also deteriorates the hot workability and weldability; in particular, when the content of S exceeds 0.03%, the corrosion resistance, hot workability and weldability markedly deteriorate. Therefore, the content of S is set to not more than 0.03%. It is desirable that the S content be reduced as low as possible; therefore, the content of S is preferably not more than 0.01% and more preferably not more than 0.005%.

Ni: more than 30% to not more than 70%

Ni is an essential element for ensuring a stable austenitic microstructure. As mentioned hereinabove, it is necessary, for the welding material according to the present invention, that the content of Cr be more than 22%. If the Ni content is not more than 30% relative to the above-mentioned Cr content, it is difficult for the obtained weld metal to have a stable single phase of austenitic microstructure and, at the same time, the austenitic microstructure becomes unstable during a long period of use at high temperatures. Also the high temperature strength and toughness are markedly deteriorated due to precipitation of such brittle phases as the σ phase and so on. On the other hand, as the Ni content increases, the amount of P which is dissolved in austenite decreases and the malignant influence of P on the susceptibility to weld solidification cracking increases. In particular, when the content of Ni exceeds 70%, the solubility of P in the matrix is reduced and, accordingly, the concentration of P in the liquid phase becomes more enhanced and, as a result, the susceptibility to weld solidification cracking becomes very high; moreover, the component cost also piles up. Therefore, the content of Ni is set to more than 30% to not more than 70%. The content of Ni is more preferably 35 to 65%.

Sol. Al: 0.001 to 1%

Al reacts with O (oxygen) coming from the air on the occasion of welding to thereby produces a deoxidizing effect. In order to obtain this effect, it is necessary that the content of Al as sol. Al ("acid-soluble Al") be not less than 0.001%. However, when the content of Al as sol. Al exceeds 1%, excessive amounts of intermetallic compounds precipitate at high temperatures; thus the toughness markedly decreases. In the above case, the marked decrease in ductility may also occur. Therefore, the content of sol. Al is set to 0.001 to 1%.

N: not more than 0.3%

When the content of N exceeds 0.3%, it causes a deterioration of hot workability. Therefore, the content of N is set to not more than 0.3%. It is desirable that the N content be as low as possible; therefore, the content of N is more preferably not more than 0.2% and further more preferably not more than 0.15%.

From the reasons mentioned above, the basic chemical compositions of the welding materials, according to the present inventions (1) to (4), are defined as the ones which comprise C: more than 0.3% to not more than 3.0%, Si: not more than 4.0%, Mn: not more than 3.0%, P: not more than 0.03%, 5: not more than 0.03%, Cr: more than 22% to not more than 55%, Ni: more than 30% to not more than 70%, sol. Al: 0.001 to 1% and N: not more than 0.3%, with the balance being Fe and impurities.

Moreover, the basic chemical compositions of the welding materials for the primary pass of the multi-layer welding which is to be used for obtaining the welded joint structures, according to the present inventions (7) to (9), are defined as the ones which comprise C: more than 0.6% to not more than 2.0%, Si: not more than 4.0%, Mn: not more than 3.0%, P: not more than 0.03%, S: not more than 0.03%, Cr: more than 22% to not more than 35%, Ni: more than 30% to not more than 70%, sol. Al: 0.001 to 1% and N: not more than 0.3%, with the balance being Fe and impurities.

Further, both the basic chemical compositions, of the welding materials for the subsequent build-up passes of the multi-layer welding which is to be used for obtaining the welded joint structures according to the present inventions (7) to (9) and, of the welding materials to be used for obtaining the welded joint structures according to the present inventions (10) to (12), are defined as the ones which comprise C: more than 0.2% to not more than 0.6%, Si: not more than 4.0%, Mn: not more than 3.0%, P: not more than 0.03%, S: not more than 0.03%, Cr: more than 22% to not more than 35%, Ni: more than 30% to not more than 70%, sol. Al: 0.001 to 1% and N: not more than 0.3%, with the balance being Fe and impurities.

And furthermore, the basic chemical compositions of the welding materials to be used for obtaining the welded joint structures, according to the present inventions (10) to (12), are defined as the ones which comprise C: more than 0.2% to not more than 0.6%, Si: not more than 4.0%, Mn: not more than 3.0%, P: not more than 0.03%, S: not more than 0.03%, Cr: more than 22% to not more than 35%, Ni: more than 30% to not more than 70%, sol. Al: 0.001 to 1% and N: not more than 0.3%, with the balance being Fe and impurities.

The welding material to be used for the primary pass welding may be in the form of a solid wire or a spool; insert rings may also be used.

(A-4) Regarding Base Metals to be Used in the Present Inventions (1), (2), (5), (7), (8), (10) and (11):

C: not more than 2.0%

C is an element which enhances the high temperature strength. In order to obtain this effect, it is preferable to contain a C content of not less than 0.01%. On the other hand, when the C content is excessive, in particular when it exceeds 2.0%, excessive amounts of Cr carbides crystallize out or precipitate; therefore, marked deterioration in ductility of materials occurs. Furthermore, the temperature which is high and at which the ductility is lost (the so-called "zero ductility temperature") has fallen markedly or marked deteriorations in ductility are caused in the vicinity of about 1000° C., accordingly, the hot workability is markedly deteriorated. Therefore, the content of C is set to not more than 2.0%.

Si: not more than 4.0%

Si is an element having a deoxidizing effect in the step of melting the metallic materials and further is effective in increasing the oxidation resistance, steam oxidation resistance and so on. In order to obtain the effects mentioned above, it is preferable to contain a Si content of not less than 0.1%. However, when the content of Si becomes excessive, in particular when it exceeds 4.0%, the susceptibility to weld solidification cracking markedly increases. Therefore, the content of Si is set to not more than 4.0%. The content of Si is more preferably not more than 3.0% and further more preferably not more than 2.0%.

Mn: 0.01 to 3.0%

Mn is an element effective in preventing hot working brittleness due to the S which is contained as an impurity in the metallic materials and, in addition, Mn is effective in deoxidation on the occasion of melting the materials. In order to obtain these effects, a content of Mn not less than 0.01% is necessary. However, if the content of Mn exceeds 3.0%, it promotes the precipitation of such intermetallic compounds as the a phase and so on; thus a decrease in toughness and/or ductility due to the deterioration of microstructural stability at high temperatures occurs. Therefore, the content of Mn is set to 0.01 to 3.0%. The content of Mn is more preferably 0.10 to 2.0% and further more preferably 0.30 to 1.5%.

P: more than 0.03% to not more than 0.3% (in the "chemical composition 1" mentioned above and in the base metals to be used in the present invention (5))

P is conventionally known to be an element which markedly increases the susceptibility to weld solidification cracking. In the case of the fully austenitic solidification, in particular, the said malignant influence increases markedly. Therefore, the content thereof has been restricted. However, a P content of more than 0.03% is effective in improving material characteristics, for example in bringing about improvements in high temperature strength, corrosion resistance and so on. On the other hand, an excessively high P content, in particular a P content of more than 0.3% deteriorates the very performance characteristics of the base metals. Therefore, both of the P contents, in the above-mentioned "chemical composition 1" being included in the base metals of the present inventions (1), (2), (7), (8), (10) and (11) and in the base metals to be used in the present invention (5), are set to more than 0.03% to not more than 0.3%. Both of the P contents, in the "chemical composition 1" and in the base metals to be used in the present invention (5), are more preferably over 0.05% to not more than 0.3% and further more preferably over 0.08% to not more than 0.2%.

P: not more than 0.03% (in the "chemical composition 2" mentioned above)

In the present inventions (2), (8) and (11), the base metal having the "chemical composition 2" is a base metal to be submitted to "dissimilar material welding" to a base metal having a P content more than 0.03% to not more than 0.3% as shown in the "chemical composition 1" mentioned above. As already mentioned hereinabove, P is conventionally known to be an element which markedly increases the susceptibility to weld solidification cracking, and in the case of the fully austenitic solidification, in particular, the said malignant influence increases markedly. Therefore, for the purpose of reducing the susceptibility to weld solidification cracking, the P content in the above-mentioned "chemical composition 2" being included in the base metals to be used in the present inventions (2), (8) and (11) is set to not more than 0.03%. The P content in the "chemical composition 2" is more preferably not more than 0.02%.

S: not more than 0.03%

S is an impurity element coming from raw materials, for example, in the step of melting the metallic materials. A high content of S causes the deterioration of corrosion resistance and it also deteriorates the hot workability and weldability; in particular, when the content of S exceeds 0.03%, the corrosion resistance, hot workability and weldability markedly deteriorate. Therefore, the content of S is set to not more than 0.03%. It is desirable that the S content be reduced as low as possible; therefore, the content of S is preferably not more than 0.01% and more preferably not more than 0.005%.

Cr: 12 to 35%

Cr is an essential element for forming a thin oxide film on the surface of the metallic materials to thereby ensure stainless steels and Ni based alloys oxidation resistance, steam oxidation resistance and high temperature corrosion resistance and so on. In order to obtain the above-mentioned effects, it is necessary to include a Cr content of not less than 12%.

In the present invention, in order to counteract the malignant influence of P on the susceptibility to weld solidification cracking, it is necessary to crystallize the said Cr-based "$M_7C_3$" type carbides. Moreover, a higher Cr content brings about a greater improvement in corrosion resistance. Therefore, a higher Cr content is desired. However, if the content of Cr is more than 35%, it becomes very difficult, in view of the balance with the Ni content, to ensure the stability of a fully austenitic microstructure which is necessary for securing creep strength for a long period of time and, in addition, coarse carbides precipitate out in large amounts; thus marked deterioration of mechanical properties, for example age-toughness and so on, occur. Therefore, the content of Cr is set to 12 to 35%.

Ni: 6 to 80%

Ni is an essential element for ensuring a stable austenitic microstructure and the necessary minimum content thereof is determined by the contents of elements contained in the austenitic alloys such as Cr, Mo, W, Nb and the like, which are the ferrite-forming elements, and Mn, C, N and so on, which are the austenite-forming elements.

As mentioned hereinabove, it is necessary, for the base metals according to the present invention, that the content of Cr be not less than 12%. If the Ni content is less than 6% relative to the above-mentioned Cr content, it is difficult to form a stable single phase of austenitic microstructure and, further the austenitic microstructure becomes unstable during a long period of use at high temperatures and the high temperature strength and toughness are markedly deteriorated due to precipitation of such brittle phases as the a phase and so on. On the other hand, as the Ni content increases, the amount of P which is dissolved in austenite decreases and the malignant influence of P on the susceptibility to weld solidification cracking increases. In particular, when the content of Ni exceeds 80%, the solubility of P in the matrix is reduced and, accordingly, the concentration of P in the liquid phase becomes more enhanced and, as a result, the susceptibility to weld solidification cracking becomes very high; moreover, the component cost also piles up. Therefore, the content of Ni is set to 6 to 80%. The content of Ni is more preferably 8 to 55%.

Sol. Al: 0.001 to 5%

Al has deoxidizing effect in the step of melting the metallic materials. In order to obtain this effect, it is necessary that the content of Al as sol. Al ("acid-soluble Al") be not less than 0.001%. When Al is contained at a high concentration, it forms the y' phase, which is stable at high temperatures; and thus Al contributes toward improvements in creep strength and also contributes toward improvements in corrosion resistance at high temperatures through oxide film formation. However, when the content of Al as sol. Al exceeds 5%, excessive amounts of intermetallic compounds precipitate at high temperatures; thus the toughness markedly decreases. In the above case, a marked decrease of ductility may also occur.

Therefore, the content of sol. Al is set to 0.001 to 5%. The content of sol. Al is more preferably 0.005 to 3% and further more preferably 0.01 to 1%.

N: not more than 0.3%

When the content of N exceeds 0.3%, it causes a deterioration of hot workability. Therefore, the content of N is set to not more than 0.3%. It is desirable that the N content be as low as possible; therefore, the content of N is more preferably not more than 0.2% and further more preferably not more than 0.15%.

From the reasons mentioned above, the "chemical composition 1" being included in the base metals of the present inventions (1), (2), (7), (8), (10) and (11) is defined as the one which comprise C: not more than 2.0%, Si: not more than 4.0%, Mn: 0.01 to 3.0%, P: more than 0.03% to not more than 0.3%, S: not more than 0.03%, Cr: 12 to 35%, Ni: 6 to 80%, sol. Al: 0.001 to 5% and N: not more than 0.3%, with the balance being Fe and impurities.

From the same reasons, the chemical composition of the base metal to be used in the present invention (5) is defined as the one which comprises C: not more than 2.0%, Si: not more than 4.0%, Mn: 0.01 to 3.0%, P: more than 0.03% to not more than 0.3%, S: not more than 0.03%, Cr: 12 to 35%, Ni: 6 to 80%, sol. Al: 0.001 to 5% and N: not more than 0.3%, with the balance being Fe and impurities.

Further, the "chemical composition 2" being included in the base metals of the present inventions (2), (8) and (11) is defined as the one which comprises C: not more than 2.0%, Si: not more than 4.0%, Mn: 0.01 to 3.0%, P: not more than 0.03%, S: not more than 0.03%, Cr: 12 to 35%, Ni: 6 to 80%, sol. Al: 0.001 to 5% and N: not more than 0.3%, with the balance being Fe and impurities.

(A-5) Regarding Weld Metal in the Welded Joint Structure to be Used in the Present Invention (5):

In the weld metal in a welded joint structure according to the present invention (5), the chemical composition of at least the primary layer being welded from one side must comprise C: more than 0.1% to not more than 0.7%, Si: not more than 4.0%, Mn: not more than 3.0%, P: more than 0.03% to not more than 0.1%, S; not more than 0.03%, Cr: 18 to 30%, Ni: more than 10% to not more than 70%, sol. Al: 0.001 to 1% and N: not more than 0.3%, with the balance being Fe and impurities. In the following, these requirements are explained.

C: more than 0.1% to not more than 0.7%

C is one of the most important elements in the present invention. That is to say, C is an indispensable element in order to promote the crystallization of the Cr-based "$M_7C_3$" type carbides which are necessary for counteracting the malignant influence of an increased P content on the susceptibility to weld solidification cracking of austenitic alloys.

In welding austenitic alloys having a Cr content of not less than 12%, in order to stably inhibit solidification cracking even when P comes from base metals which contains P at a high level of more than 0.03%, it is necessary that at least the primary layer being welded from one side of the weld metal (hereinafter also referred to as "primary layer of the weld metal in one side welding") contain C content of more than 0.1%. A higher C content is more favorable; however, if the content of C is more than 0.7%, the ductility of the weld metal may sometimes become very poor. Therefore, the content of C in the primary layer of the weld metal in one side welding is set to more than 0.1% to not more than 0.7%. The abovementioned C content is more preferably more than 0.2% and further more preferably more than 0.3%.

Si: not more than 4.0%

Si is an element having a deoxidizing effect on the occasion of welding and further is effective in increasing the oxidation resistance, steam oxidation resistance and so on. In order to obtain the effects mentioned above, it is preferable to contain a Si content of not less than 0.1% in the primary layer of the weld metal in one side welding. However, when the content of Si becomes excessive, in particular when it exceeds 4.0%, the susceptibility to weld solidification cracking markedly increases. Therefore, the content of Si is set to not more than 4.0%. The content of Si is more preferably not more than 3.0% and further more preferably not more than 2.0%.

Mn: not more than 3.0%

Mn is an element effective in preventing hot working brittleness due to the S which is contained as an impurity in the metallic materials and, in addition, Mn is effective in deoxidation on the occasion of welding. In order to obtain these effects, it is preferable to contain a Mn content of not less than 0.01% in the primary layer of the weld metal in one side welding. However, if the content of Mn exceeds 3.0%, it promotes the precipitation of such intermetallic compounds as the a phase and so on; thus a decrease in toughness and/or ductility due to the deterioration of microstructural stability at high temperatures occurs. Therefore, the content of Mn is set to not more than 3.0%. The content of Mn is more preferably 0.10 to 2.0% and further more preferably 0.30 to 1.5%.

P: more than 0.03% to not more than 0.1%

P is conventionally known to be an element which markedly increases the susceptibility to weld solidification cracking. In the case of the fully austenitic solidification, in particular, the said malignant influence increases markedly. In the present invention (5), however, base metals having an increased P content are used for bringing about improvements in high temperature strength and corrosion resistance and, therefore, from the viewpoint of ensuring high temperature strength and corrosion resistance, the content of P in the primary layer of the weld metal in one side welding is set to more than 0.03%. However, an excessively high P content, in particular a P content of more than 0.1% increases the susceptibility to weld solidification cracking. Therefore, the content of P is set to more than 0.03% to not more than 0.1%. From the viewpoint of high temperature strength, the content of P is more preferably more than 0.04% and further more preferably more than 0.05%.

S: not more than 0.03%

A high content of S causes the deterioration of corrosion resistance and it also deteriorates the weldability; in particular, when the content of S exceeds 0.03%, the corrosion resistance and weldability markedly deteriorate. Therefore, the content of S in the primary layer of the weld metal in one side welding is set to not more than 0.03%. It is desirable that the S content be reduced as low as possible; therefore, the content of S is preferably not more than 0.01% and more preferably not more than 0.005%.

Cr: 18 to 30%

Cr is an essential element for forming a thin oxide film on the surface of the metallic materials to thereby ensure stainless steels and Ni based alloys oxidation resistance, steam oxidation resistance and high temperature corrosion resistance and so on. In addition, like C, in the present invention Cr is an indispensable element in order to crystallize the said "$M_7C_3$" type carbides. In order to stably inhibit solidification cracking even when P comes from base metals which contains P at a high level of more than 0.03%, it is necessary for the primary layer of the weld metal in one side welding to contain a Cr content of not less than 18%. However, when the content of Cr exceeds 30%, it becomes difficult to ensure the ductility of the welded joint. Therefore, the content of Cr is set to 18 to 30%.

Ni: more than 10% to not more than 70%

Ni is an essential element for ensuring a stable austenitic microstructure. As mentioned above, in the present invention (5), it is necessary for the primary layer of the weld metal in one side welding to contain a Cr content of not less than 18%. If the Ni content is not more than 10% relative to the above-mentioned Cr content, it is difficult for the weld metal obtained in one side welding to form a stable single phase of austenitic microstructure and, furthermore, the austenitic microstructure becomes unstable during a long period of use at high temperatures and the high temperature strength and toughness are markedly deteriorated due to precipitation of such brittle phases as the σ phase and so on. On the other hand, as the Ni content increases, the amount of P which is dissolved in austenite decreases and the malignant influence of P on the susceptibility to weld solidification cracking increases. In particular, when the content of Ni exceeds 70%, the susceptibility to weld solidification cracking becomes very high; moreover, the component cost also piles up. Therefore, the content of Ni is set to more than 10% to not more than 70%. The content of Ni is more preferably 25 to 50%.

Sol. Al: 0.001 to 1%

Al reacts with O (oxygen) coming from the air on the occasion of welding to thereby produces a deoxidizing effect. In order to obtain this effect, it is necessary that the content of Al as sol. Al ("acid-soluble Al") be not less than 0.001%. However, when the content of Al as sol. Al exceeds 1%, excessive amounts of intermetallic compounds precipitate at high temperatures; thus the toughness markedly decreases. Therefore, the content of sol. Al is set to 0.001 to 1%.

N: not more than 0.3%

When the content of N exceeds 0.3%, it causes precipitation of nitrides such as $Cr_2N$ and so on; and thus causes a deterioration of such mechanical properties as bendability and toughness of the weld metal. Therefore, the content of N is set to not more than 0.3%. It is desirable that the N content be reduced as low as possible; therefore, the content of N is preferably not more than 0.2% and more preferably not more than 0.15%.

From the reasons mentioned above, the chemical composition of at least the primary layer being welded from one side of the weld metal in the welded joint structure according to the present invention (5) is defined as the one which comprises C: more than 0.1% to not more than 0.7%, Si: not more than 4.0%, Mn: not more than 3.0%, P: more than 0.03% to not more than 0.1%, S: not more than 0.03%, Cr: 18 to 30%, Ni: more than 10% to not more than 70%, sol. Al: 0.001 to 1% and N: not more than 0.3%, with the balance being Fe and impurities.

(A-6) Regarding Base Metals and Welding Material According to the Present Inventions (3); Base Metals and Weld Metal According to the Present Invention (6); Base Metals and Welding Material According to the Present Inventions (9); and Base Metals and Welding Material According to the Present Inventions (12):

At least one material among the base metals and welding material of the present inventions (1) or (2); at least one of the base metals and weld metal of the present invention (5); at least one material among the base metals and welding material of the present invention (7) or (8); and at least one of the base metals and welding material of the present invention (10) or (11), may further contain, in lieu of a part of Fe, according to need, one or more elements selected from the first group and/or second group listed below.

First group: Cu: not more than 5%, Mo: not more than 10%, W: not more than 10%, V: not more than 2%, Nb: not more than 3%, Ti: not more than 3%, Ta: not more than 8%, Zr: not more than 1%, Hf: not more than 1%, Co: not more than 15% and B: not more than 0.03%.

Second group: Ca: not more than 0.05%, Mg: not more than 0.05% and REM: not more than 0.3%.

That is to say, one or more of the first group and/or the second group of elements mentioned above may be contained as an optional element or elements.

The above-mentioned optional elements will be explained below.

Each of Cu, Mo, W, V, Nb, Ti, Ta, Zr, Hf, Co and B being elements of the first group, if added, has the effect of enhancing the creep strength. In order to obtain this effect, the said elements may be added to the alloys and thereby contained therein. In the following, the elements, which are in the first group, are described in detail.

Cu: not more than 5%

Cu precipitates as the state of the fine Cu phase coherently with the austenitic matrix during the use at high temperatures. Thus Cu has the effect of markedly enhancing the creep strength. Cu is also effective in inhibiting CO from dissociating to thereby prevent C from entering the steel and thus brings about marked improvements in corrosion resistance. In order to ensure the above-mentioned effects, the content of Cu is preferably not less than 0.01%. However, when the content of Cu becomes excessive, in particular, when it exceeds 5%, deterioration of hot workability, weldability and creep ductility occurs. Therefore, when Cu is included, the content of Cu is set to not more than 5%. If Cu is included, the content of Cu is preferably 0.01 to 5%. The upper limit of the Cu content is more preferably 4.0% and further more preferably 3.0%.

Mo: not more than 10%

Mo is an effective element which improves the high temperature strengths such as creep strength and so on. In order to ensure the above-mentioned effects, the content of Mo is preferably not less than 0.05%. However, when Mo is included at a content level exceeding 10%, the said effect is saturated and alloying cost increases. In addition, the formation of intermetallic compounds such as the σ phase and so on is induced; hence deterioration of microstructural stability and hot workability occurs. Therefore, when Mo is included, the content of Mo is set to not more than 10%. If Mo is included, the content of Mo is preferably 0.05 to 10% and more preferably 0.05 to 5%.

W: not more than 10%

W is also an effective element which improves the high temperature strengths such as creep strength and so on. In order to ensure the said effects, the content of W is preferably not less than 0.05%. However, when W is included at a content level exceeding 10%, the said effect is saturated and alloying cost increases. In addition, the formation of intermetallic compounds such as the σ phase and so on is induced; hence deterioration of microstructural stability and hot workability occurs. Therefore, when W is included, the content of W is set to not more than 10%. If W is included, the content of W is preferably 0.05 to 10% and more preferably 0.05 to 5%.

V: not more than 2%

V is a carbide-forming element and is an effective element which improves the high temperature strengths such as creep strength and so on. In order to ensure the above-mentioned effects, the content of V is preferably not less than 0.02%. However, if the content of V exceeds 2%, marked deterioration of mechanical properties such as toughness and so on occurs. Therefore, when V is included, the content of V is set to not more than 2%. If V is included, the content of V is preferably 0.02 to 2% and more preferably 0.02 to 1.5%. Further more preferably, the content of V is 0.04 to 1%.

Nb: not more than 3%

Nb is a carbide-forming element and is an effective element which improves the high temperature strengths such as creep strength and so on. In order to ensure the said effects, the content of Nb is preferably not less than 0.05%. However, if the content of Nb exceeds 3%, marked deterioration of mechanical properties such as toughness and so on occurs. Therefore, when Nb is included, the content of Nb is set to not more than 3%. If Nb is included, the content of Nb is preferably 0.05 to 3% and more preferably 0.05 to 1.5%.

Ti: not more than 3%

Ti is a carbide-forming element and is an effective element which improves the high temperature strengths such as creep strength and so on. In order to ensure the above-mentioned effects, the content of Ti is preferably not less than 0.005%. However, if the content of Ti exceeds 3%, marked deterioration of mechanical properties such as toughness and so on occurs. Therefore, when Ti is included, the content of Ti is set to not more than 3%. If Ti is included, the content of Ti is preferably 0.005 to 3% and more preferably 0.005 to 2%.

Ta: not more than 8%

Ta is also a carbide-forming element and is an effective element which improves the high temperature strengths such as creep strength and so on. In order to ensure the said effects, the content of Ta is preferably not less than 0.01%. However, if the content of Ta exceeds 8%, marked deterioration of mechanical properties such as toughness and so on occurs. Therefore, when Ta is included, the content of Ta is set to not more than 8%. If Ta is included, the content of Ta is preferably 0.01 to 8% and more preferably 0.01 to 7%. Further more preferably, the content of Ta is 0.05 to 6%.

Zr: not more than 1%

Zr mainly contributes to grain boundary strengthening and brings about improvements in creep strength. In order to ensure the said effects, the content of Zr is preferably not less than 0.0005%. However, if the content of Zr exceeds 1%, deterioration of mechanical properties and weldability occurs. Therefore, when Zr is comprised, the content of Zr is set to not more than 1%. If Zr is comprised, the content of Zr is preferably 0.0005 to 1% and more preferably 0.01 to 0.8%. Further more preferably, the content of Zr is 0.02 to 0.5%.

Hf: not more than 1%

Hf also mainly contributes to grain boundary strengthening and brings about improvements in creep strength. In order to ensure the above-mentioned effects, the content of Hf is preferably not less than 0.0005%. However, if the content of Hf exceeds 1%, deterioration of mechanical properties and weldability occurs. Therefore, when Hf is included, the content of Hf is set to not more than 1%. If Zr is included, the content of Hf is preferably 0.0005 to 1% and more preferably 0.01 to 0.8%. Further more preferably, the content of Hf is 0.02 to 0.5%.

Co: not more than 15%

Like Ni, Co stabilizes the austenitic microstructure and has the effect of enhancing the creep strength. In order to ensure the said effects, the content of Co is preferably not less than 0.05%. However, at a Co content level which exceeds 15%, the said effects of Co arrive at saturation levels and the economic efficiency only declines. Therefore, when Co is included, the content of Co is set to not more than 15%. If Co is included, the content of Co is preferably 0.05 to 10%.

B: not more than 0.03%

B exists in carbonitrides and promotes finely dispersed precipitation of carbonitrides during the use at high temperatures, and at the same time, B exists singly at grain boundaries and therefore strengthens grain boundaries and prevents grain boundary sliding. And thereby, B enhances the creep strength. In order to ensure the said effects, the content of B is preferably set to not less than 0.0005%. However, if the content of B exceeds 0.03%, deterioration of weldability occurs. Therefore, when B is comprised, the content of B is set to not more than 0.03%. If B is comprised, the content of B is preferably 0.0005 to 0.03% and more preferably 0.001 to 0.01%. Further more preferably, the content of B is 0.001 to 0.005%.

The above-mentioned elements, namely Cu, Mo, W, V, Nb, Ti, Ta, Zr, Hf, Co and B may be included singly, or two or more of them may be included in combination.

Each of Ca, Mg and REM being elements of the second group, if added, has the effect of improving the hot workability. In order to obtain this effect, the said elements may be added to the alloys and thereby contained therein. In the following, the elements, which are in the second group, are described in detail.

Ca: not more than 0.05%

Ca has an effect of improving the hot workability. In order to ensure this effect, the content of Ca is preferably set to not less than 0.0001%. However, a Ca content which exceeds 0.05% causes a decrease in hot workability due to the formation of oxide type inclusions and also causes deterioration of ductility. Therefore, when Ca is included, the content of Ca is set to not more than 0.05%. If Ca is included, the content of Ca is preferably 0.0001 to 0.05% and more preferably 0.001 to 0.02%. Further more preferably, the content of Ca is 0.001 to 0.01%.

Mg: not more than 0.05%

Mg also has an effect of improving the hot workability. In order to ensure this effect, the content of Mg is preferably set to not less than 0.0005%. However, a Mg content which exceeds 0.05% causes a decrease in hot workability due to the formation of oxide type inclusions and also causes deterioration of ductility. Therefore, when Mg is included, the content of Mg is set to not more than 0.05%. If Mg is included, the content of Mg is preferably 0.0005 to 0.05% and more preferably 0.001 to 0.02%. Further more preferably, the content of Mg is 0.001 to 0.01%.

REM: not more than 0.3%

REM has an affinity for impurity elements which are contained in metallic materials; in particular REM has a high affinity for S and, therefore, has an effect for preventing deterioration of hot workability due to the S being excessively contained. This effect becomes markedly when the content of REM is not less than 0.005%. However, a REM content which exceeds 0.3% induces the formation of coarse oxides and sulfides; and thus causes deterioration of hot workability and, further, causes an increased number of surface defects as well as deterioration of toughness. Therefore, when REM is included, the content of REM is set to not more than 0.3%. If REM is included, the content of REM is preferably 0.005 to 0.3% and more preferably 0.005 to 0.1%. Further more preferably, the content of REM is 0.005 to 0.07%.

The above-mentioned elements, namely Ca, Mg and REM may be included singly, or two or more of them may be included in combination.

As already mentioned hereinabove, the term "REM" refers to a total of 17 elements including Sc, Y and lanthanoid collectively, and the REM content means the content of one or the total content of two or more of the REM.

From the reasons mentioned above, in the present invention (3), it has been stipulated that one or more alloys among the base metals and welding material further contain, respectively and according to need, one or more elements selected from the first group and the second group or both mentioned above in addition to the elements according to the present invention (1) or (2). It has also been stipulated that, in the present invention (9), one or more alloys among the base metals and welding material further contain, respectively and according to need, one or more elements selected from the first group and the second group or both mentioned above in addition to the elements according to the present invention (7) or (8). Similarly, it has been stipulated that, in the present invention (12), one or more alloys among the base metals and welding material further contain, respectively and according to need, one or more elements selected from the first group and the second group or both mentioned above in addition to the elements according to the present invention (10) or (11).

From the same reasons, in the present invention (6), it has been stipulated that one or both of the base metals further contain one or more elements selected from the first group and the second group or both mentioned above in addition to the base metal elements according to the present invention (5).

Further, in the present invention (6), it has been stipulated that a weld metal further contains one or more elements selected from the first group and the second group or both mentioned above in addition to the weld metal elements according to the present invention (5).

The welding materials according to the present inventions (1) to (3) and the welding materials to be used on the occasion of producing the welded joint structures according to the present inventions (7) to (12) can be produced, for example, by melting alloys having the respective compositions mentioned above, followed by working into wires by forging and rolling. The welding materials according to the present inventions (1) to (3) and the welding materials to be used on the occasion of primary pass welding in producing the welded joint structures according to the present inventions (7) to (9) can also be produced in the form of insert rings and further can be produced by covering or coating Cr—Ni alloy plate sheath materials with a high-C—Cr—Ni alloy powder, a high-C—Cr alloy powder and so on, followed by wire drawing so as to attain the respective regulated chemical compositions.

The welding materials according to the present inventions (1) to (3) can be used in various welding processes such as TIG welding and MIG welding and so on.

Therefore, the welded joint structure of the present invention (4) can be produced by welding together the austenitic alloy base metals according to any one of the present inventions (1) to (3) by various welding methods using the welding material according to any one of the present inventions (1) to (3).

In cases where multi-layer welding is required in welding together the base metals according to any one of the present inventions (1) to (3) to give the welded joint structure according to the present invention (4), the multi-layer welding may also be carried out using the welding material according to any one of the present inventions (1) to (3).

In cases where high levels of corrosion resistance and creep strength are required in the weld metal, it is also possible to carry out the primary pass welding, in which the ratio of dilution from base metals is high, using the welding material according to any one of the present inventions (1) to (3) and, in the subsequent build-up passes, carry out the welding using a commercially available welding material properly selected according to the ratio of dilution from base metals, which influences the weld solidification cracking. For example, in the case of welding where the ratio of dilution from base metals is fairly low such as not more than 20%, it may use a commercially available welding material according to the required levels of corrosion resistance and creep strength.

Like the welding materials according to the present inventions (1) to (3), the welding materials to be used on the occasion of producing the welded joint structures according to the present inventions (7) to (12) can be used in various welding processes such as TIG welding and MIG welding and so on.

Therefore, the welded joint structures of the present inventions (7) to (9) can be produced by welding together the austenitic alloy base metals according to any one of the present inventions (7) to (9) by various welding methods using any one of the welding materials for the primary pass welding and any one of the welding materials for the subsequent build-up passes to be used in producing the welded joint structures according to any one of the present inventions (7) to (9). The welded joint structures of the present inventions (10) to (12) can be produced by welding together the austenitic alloy base metals according to any one of the inventions (10) to (12) by various welding methods using any one of the welding materials according to the present inventions (10) to (12).

In cases where high levels of corrosion resistance and creep strength are required in the weld metal, it is not always necessary to form all layers in the subsequent build-up passes of the multi-layer welding using the welding material according to any one of the present inventions (7) to (12) but it is possible to carry out an intermediate layer welding pass and the subsequent layer welding passes using a commercially available welding material properly selected, according to the ratio of dilution from base metals, which influences the weld solidification cracking. For example, in the case of welding where the ratio of dilution from base metals is fairly low such as not more than 20%, it may use a commercially available welding material, according to the required levels of corrosion resistance and creep strength.

Further, in the case of welding thick base metals together, the welding materials for the primary pass welding according to any one of the inventions (7) to (9) may be used not only in forming the primary layer but also in forming the second and subsequent layers according to the required level of ductility; thus, the welding material regulated for use in the primary pass welding and the welding material regulated for use in the subsequent build-up passes of the multi-layer welding may be used in combination in an appropriate manner.

While, in the case of similar material welding, the welding is carried out using austenitic alloys having the "chemical composition 1" as base metals, it is not always necessary that both the base metals are identical in chemical composition; it is only required that they be austenitic alloys respectively falling within the range of the "chemical composition 1". In the case of dissimilar material welding, the welding may be carried out using, as one of the base metals, an austenitic alloy having a composition falling within the range of the "chemical composition 1" and, as the other base metal, an austenitic alloy having a composition falling within the range of the "chemical composition 2". Each base metal mentioned above may be an austenitic alloy which further contains, according to need, one or more elements selected from the first group and second group or both mentioned hereinabove.

(B) Penetration Bead Height of the Weld Metal in the Welded Joint Structure

The welded joint structures according to the present inventions (5) and (6) each has a penetration bead formed on the side opposite to the side from which one side welding has been performed in the case of using sheets as the base metals or, in the case of using tubular materials as the base metals, on the inside of a tube as a result of circumferential welding from the outside of the tubular materials. In this case, the penetration bead of the weld metal in each welded joint structure is required to have a height of 0 to 3 mm so that a level of strength required of the welded joint structure can be ensured and a sound bead shape can be obtained.

When the penetration bead height is less than 0 mm, there is found the so-called "concave bead" where the bead surface is lower than the surface opposite to the face on which the welding has been performed (interior surface in the case of a pipe); the strength of the welded joint structure thus becomes insufficient. On the other hand, a penetration bead height which exceeds 3 mm is unfavorable for ensuring strength since the convex portion becomes excessively large and causes increased stress concentration at the bead toe.

Therefore, the penetration bead height of the weld metal in the welded joint structure according to the present invention (5) or (6) is set to 0 to 3 mm.

The chemical composition of the weld metal in each of the above-mentioned welded joint structures should satisfy the requirements given above in the section (A). Therefore, the welding material for use in the production of the above-mentioned welded joint structures is to be selected according to the welding method and welding conditions employed so that the above-mentioned weld metal composition can be obtained.

However, when the welding is carried out using a welding material different in chemical composition from the base metals, the chemical composition of the weld metal may be changed by dilution from the base metals according to the welding conditions, such as welding heat input, groove shape and other multi-layer formation conditions. In particular, when the P content in the austenitic alloy base metals is high and more than 0.03%, as in the case of the welded joint structure according to the present invention (5) or (6), P flows into the weld metal to increase the P content in the liquid phase, so that the susceptibility to weld solidification cracking becomes high as compared with the case of welding together base metals having an ordinary level P content not more than 0.03%. Therefore, in order to inhibit weld solidification cracking, it is recommended that the welding be carried out using a high-C and high-Cr content welding material at least in the primary pass welding and selecting the welding conditions so that at least the chemical composition of the weld metal in the primary layer may have a composition falling within the range mentioned hereinabove.

Even when the conventional welding materials are used, it will be theoretically possible in certain cases to obtain a weld metal having a chemical composition falling within the range mentioned above by suppressing the ratio of dilution from the base metals to extremely low levels. However, in such a case, it becomes difficult to ensure a sound bead shape having a height within the above-mentioned range of 0 to 3 mm.

The following examples illustrate the present invention more specifically. These examples are, however, by no means limited to the scope of the present invention.

EXAMPLES

Example 1

Austenitic alloys A to E, having the chemical compositions shown in Table 1, were melted using a high frequency induction vacuum furnace and then cast to form ingots for use as base metals.

Both of the alloys A and E shown in Table 1 are austenitic alloys having the P content as high as 0.100%. On the other hand, the alloys B to D are ordinary P content level austenitic alloys respectively having the P contents of 0.015%, 0.030% and 0.018%.

TABLE 1

| | Chemical composition (% by mass) The balance: Fe and impurities | | | | | | | | | |
|---|---|---|---|---|---|---|---|---|---|---|
| Alloy | C | Si | Mn | P | S | Cr | Ni | sol. Al | N | Others |
| A | 0.10 | 0.20 | 0.60 | 0.100 | 0.0005 | 18.12 | 8.86 | 0.026 | 0.009 | Cu: 0.29, Nb: 0.21, Ti: 0.19 |
| B | 0.06 | 0.42 | 1.18 | 0.015 | 0.0010 | 25.07 | 19.90 | 0.021 | 0.250 | Nb: 0.44, B: 0.0018 |
| C | 0.10 | 0.27 | 0.80 | 0.030 | 0.0002 | 18.10 | 9.30 | 0.025 | 0.094 | Cu: 2.95, Nb: 0.42, Mo: 0.16 |
| D | 0.08 | 0.22 | 0.60 | 0.018 | 0.0004 | 22.30 | 20.41 | 0.022 | 0.012 | — |
| E | 0.39 | 0.21 | 0.82 | 0.100 | 0.0004 | 29.64 | 49.56 | 0.013 | 0.011 | — |

Austenitic alloys F to H, having the chemical compositions shown in Table 2, were melted using a high frequency induction vacuum furnace and then cast to form ingots for use as welding materials.

The alloy G shown in Table 2 is an alloy whose C and Cr contents are out of the range which is regulated as the chemical composition of the welding material by the present invention.

TABLE 2

| | Chemical composition (% by mass) The balance: Fe and impurities | | | | | | | | | |
|---|---|---|---|---|---|---|---|---|---|---|
| Alloy | C | Si | Mn | P | S | Cr | Ni | sol. Al | N | Others |
| F | 0.96 | 0.25 | 0.85 | 0.006 | 0.0010 | 29.45 | 60.39 | 0.002 | 0.005 | — |
| G | *0.08 | 0.29 | 0.84 | 0.006 | 0.0010 | *17.84 | 32.43 | 0.003 | 0.006 | — |
| H | 0.99 | 0.22 | 0.63 | 0.006 | 0.0010 | 30.61 | 60.14 | 0.034 | 0.005 | Mo: 0.36, B: 0.0014 |

The mark * indicates falling outside the conditions regulated by the present invention.

Each ingot of the alloys A to E to be used as base metals was hot-forged in the conventional manner and then subjected to a solution heat treatment at 1200° C., and then processed into restraint weld cracking test specimens with a shape of U-groove (a butt thickness of 1.5 mm and an extension length of 2.5 mm) at the butt end and having a thickness of 12 mm, a width of 50 mm and a length of 100 mm.

Each ingot of the alloys F to H was hot-forged in the conventional manner and then subjected to cold working with repetitions of solution heat treatment before each cold working in order to obtain welding materials each in the form of a wound wire having a diameter of 1.2 mm.

The thus-obtained restraint weld cracking test specimens were peripherally restrained-welded; that is to say, using the said specimens, similar material welding (alloy A to alloy A and alloy E to alloy E) and dissimilar material welding (combinations of alloy A and alloy B, alloy A and alloy C, alloy A and alloy D, and alloy D and alloy E) were carried out in a peripherally restrained state.

Concretely, each butt site was subjected to primary pass welding using any one of the above-mentioned welding materials F to H by the TIG welding under the following conditions: welding current of 100 A, welding voltage of 12 V, and welding speed of 10 cm/min. In the said welding, the root gap was 0 mm, and three feeding speeds of the welding material, namely 48 cm/min, 54 cm/min and 62 cm/min, were employed to thereby vary the ratio of dilution from base metals.

After the said restraint welding, the weld bead surface in each specimen was observed to determine whether the solidification cracking occurred or not.

Furthermore, five samples for sectional microstructure observation of the welded joint were taken from each test specimen. After mirror-like polishing each surface of the said samples was examined to determine whether the solidification cracking occurred or not, using an optical microscope at a magnification of 500 times. After the said examination, the ratio of the area of the melted base metal portions to the area of the weld metal of the primary layer obtained by image analysis, namely the ratio "(area of the melted base metal portions)/(area of the weld metal of the primary layer)", was calculated for each sample in order to determine the average ratio of dilution from base metals of each said test specimen.

For each of the welded joint test specimens obtained by similar material welding, namely the welding of alloy A-to-alloy A or alloy E-to-alloy E, in which the austenitic alloys A and E had a high-P of 0.100%, the penetration bead height was measured and the chemical composition of the obtained weld metal of the primary layer was analyzed, in addition to the examinations mentioned hereinabove.

For each test specimen, the welding conditions, the average ratio of dilution from base metals, the occurrence or nonoccurrence of bead surface cracking and the incidence of weld solidification cracking in the said five samples for sectional microstructure observation are shown in Table 3.

The penetration bead heights and the chemical compositions in the weld metal of the primary layer, examined for each welded joint test specimens obtained by similar material welding, namely the welding of alloy A-to-alloy A or alloy E-to-alloy E, are shown in Table 4.

TABLE 3

| Test specimen No. | Combination of base metals | Welding material | Feeding speed of the welding material (cm/min) | Average ratio of dilution from base metals (%) | Bead surface cracking | Weld solidification cracking (Number of cracking)/(Number of observed section) | Note |
|---|---|---|---|---|---|---|---|
| 1 | A-A | F | 48 | 63 | free | 0/5 | Inventive |
| 2 | A-A | F | 54 | 59 | free | 0/5 | Example |
| 3 | A-A | F | 62 | 51 | free | 0/5 | |
| 4 | A-A | H | 50 | 60 | free | 0/5 | |
| 5 | A-B | F | 48 | 65 | free | 0/5 | |
| 6 | A-B | F | 54 | 60 | free | 0/5 | |
| 7 | A-B | F | 62 | 50 | free | 0/5 | |
| 8 | A-C | F | 48 | 62 | free | 0/5 | |
| 9 | A-C | F | 54 | 59 | free | 0/5 | |
| 10 | A-C | F | 62 | 53 | free | 0/5 | |
| 11 | A-B | H | 62 | 52 | free | 0/5 | |
| 12 | A-D | F | 62 | 51 | free | 0/5 | |
| 13 | E-E | F | 59 | 55 | free | 0/5 | |
| 14 | D-E | F | 54 | 57 | free | 0/5 | |
| 15 | A-A | *G | 48 | 62 | occurred | 5/5 | Comparative |
| 16 | A-A | *G | 54 | 59 | occurred | 5/5 | Example |
| 17 | A-A | *G | 62 | 52 | occurred | 5/5 | |
| 18 | A-B | *G | 48 | 66 | occurred | 5/5 | |
| 19 | A-B | *G | 54 | 61 | occurred | 5/5 | |
| 20 | A-B | *G | 62 | 50 | occurred | 5/5 | |
| 21 | A-C | *G | 48 | 61 | occurred | 5/5 | |
| 22 | A-C | *G | 54 | 59 | occurred | 5/5 | |
| 23 | A-C | *G | 62 | 54 | occurred | 5/5 | |

The mark * indicates falling outside the chemical compositions regulated by the present invention.

TABLE 4

| Test specimen No. | Penetration bead height (mm) | Weld metal of the primary layer | | | | | | | | | Note |
| | | Chemical composition (% by mass) The balance: Fe and impurities | | | | | | | | | |
| | | C | Si | Mn | P | S | Cr | Ni | sol. Al | N | Others | |
|---|---|---|---|---|---|---|---|---|---|---|---|---|
| 1 | 1.2 | 0.43 | 0.22 | 0.69 | 0.064 | 0.0007 | 22.43 | 28.44 | 0.017 | 0.008 | Cu: 0.18, Nb: 0.13, Ti: 0.12 | Inventive |
| 2 | 1.6 | 0.47 | 0.22 | 0.71 | 0.060 | 0.0007 | 22.99 | 31.02 | 0.016 | 0.007 | Cu: 0.17, Nb: 0.12, Ti: 0.11 | Example |
| 3 | 2.3 | 0.51 | 0.23 | 0.72 | 0.0550 | 0.00070 | 23.56 | 33.59 | 0.0140 | 0.007 | Cu: 0.15, Nb: 0.11, Ti: 0.10 | |
| 13 | 2.0 | 0.65 | 0.23 | 0.83 | .058 | .0006 | 29.55 | 54.43 | 008 | 0.008 | — | |

TABLE 4-continued

| Test specimen No. | Penetration bead height (mm) | Weld metal of the primary layer Chemical composition (% by mass) The balance: Fe and impurities | | | | | | | | | | Note |
|---|---|---|---|---|---|---|---|---|---|---|---|---|
| | | C | Si | Mn | P | S | Cr | Ni | sol. Al | N | Others | |
| #15 | 1.4 | *0.09 | 0.23 | 0.69 | 0.065 | 0.0007 | 18.02 | 17.58 | 0.017 | 0.008 | Cu: 0.18, Nb: 0.13, Ti: 0.12 | Comparative |
| #16 | 1.6 | *0.09 | 0.24 | 0.71 | 0.059 | 0.0007 | *17.99 | 19.23 | 0.016 | 0.008 | Cu: 0.16, Nb: 0.12, Ti: 0.11 | Example |
| #17 | 2.2 | *0.09 | 0.24 | 0.71 | 0.056 | 0.0007 | *17.98 | 19.94 | 0.015 | 0.008 | Cu: 0.15, Nb: 0.11, Ti: 0.10 | |

The mark # indicates that the test specimens are obtained by welding using the welding material falling outside the conditions regulated by the present invention, and the mark * indicates falling outside the chemical compositions regulated by the present invention.

From Table 3, it is evident that no bead surface cracking was observed and no weld solidification cracking occurred in any of the test specimens in Nos. 1 to 14, which were obtained by welding, using the welding material F or H, satisfying the chemical composition requirements regulated by the present inventions (1) to (3), irrespective of whether they were products of similar material welding (alloy A to alloy A and alloy E to alloy E), or of dissimilar material welding (combinations of alloy A and alloy B, alloy A and alloy C, alloy A and alloy D, and alloy D and alloy E), even when the ratio of dilution from base metals (average ratio of dilution from base metals) was high.

On the contrary, bead surface cracking was observed and the weld solidification cracking was also found in all test specimens in Nos. 15 to 23, which were obtained by welding, using the welding material G, having C and Cr contents less than those regulated by the present invention, irrespective of whether they were products of similar material welding or of dissimilar material welding.

Further, from Table 4, it is evident that no weld solidification cracking was observed in the test specimens in Nos. 1 to 3 and 13, where the chemical composition of the primary layer of the weld metal in one side welding and the penetration bead height satisfied the respective conditions regulated by the present inventions (5) and (6); on the other hand, in the test specimens in Nos. 15 to 17, where the chemical composition of the primary layer of the weld metal in one side welding did not satisfy the condition regulated by the present inventions (5) and (6), weld solidification cracking was observed.

Example 2

Austenitic alloys D, E and I to L, having the chemical compositions shown in Table 5, were melted using a high frequency induction vacuum furnace and then cast to form ingots for use as base metals. In Table 5, the alloys D and E are the same alloys as melted in the above-mentioned "Example 1".

Both of the alloys E and I shown in Table 5 are austenitic alloys having the P content as high as 0.100%. On the other hand, the alloys D and J to L are ordinary P content level austenitic alloys respectively having the contents of P 0.018%, 0.010%, 0.015% and 0.028%.

TABLE 5

| | Chemical composition (% by mass) The balance: Fe and impurities | | | | | | | | | |
|---|---|---|---|---|---|---|---|---|---|---|
| Alloy | C | Si | Mn | P | S | Cr | Ni | sol. Al | N | Others |
| D | 0.08 | 0.22 | 0.60 | 0.018 | 0.0004 | 22.30 | 20.41 | 0.022 | 0.012 | — |
| K | 0.39 | 0.21 | 0.82 | 0.100 | 0.0004 | 29.64 | 49.56 | 0.0130. | 0.011 | — |
| I | 0.10 | 0.26 | 0.54 | 0.100 | 0.0003 | 18.34 | 9.23 | 049 | 0.010 | Nb: 0.31, Ti: 0.20 |
| J | 0.08 | 0.21 | 1.12 | 0.010 | 0.0004 | 23.21 | 45.30 | 0.028 | 0.008 | Nb: 0.20, W: 7.13, B: 0.0040 |
| K | 0.06 | 0.40 | 1.15 | 0.015 | 0.0003 | 24.93 | 19.73 | 0.006 | 0.223 | Nb: 0.42, B: 0.0014 |
| L | 0.08 | 0.27 | 0.82 | 0.028 | 0.0003 | 18.12 | 8.98 | 0.008 | 0.105 | Cu: 2.98, Nb: 0.45, Mo: 0.16 |

Austenitic alloys F and M to P, having the chemical compositions shown in Table 6, were melted using a high frequency induction vacuum furnace and then cast to form ingots for use as welding materials. The alloy F in Table 6 is the same alloy as melted in the above-mentioned "Example 1".

The alloy M shown in Table 6 is an alloy whose C content is out of the range which is regulated as the chemical composition of the welding material by the present invention.

TABLE 6

| | Chemical composition (% by mass) The balance: Fe and impurities | | | | | | | | | |
|---|---|---|---|---|---|---|---|---|---|---|
| Alloy | C | Si | Mn | P | S | Cr | Ni | sol. Al | N | Others |
| F | 0.96 | 0.25 | 0.85 | 0.006 | 0.0010 | 29.45 | 60.39 | 0.0020. | 0.005 | — |
| M | *0.16 | 0.21 | 0.63 | 0.005 | 0.0003 | 30.71 | 59.96 | 026 | 0.005 | B: 0.0018 |
| M | 0.29 | 0.23 | 0.68 | 0.005 | 0.0003 | 30.01 | 60.39 | 0.024 | 0.005 | B: 0.0030, W: 1.97 |
| O | 0.38 | 0.22 | 0.63 | 0.005 | 0.0003 | 30.72 | 60.28 | 0.059 | 0.005 | — |
| P | 0.99 | 0.22 | 0.63 | 0.006 | 0.0003 | 30.61 | 60.14 | 0.034 | 0.006 | B: 0.0014 |

The mark * indicates falling outside the conditions regulated by the present invention.

Each ingot of the alloys D, E and I to L to be used as base metals were hot-forged in the conventional manner and then subjected to a solution heat treatment at 1150° C., hollowed out in the center by machining and then processed into tubular restraint weld cracking test specimens with shapes of U-groove (a butt thickness of 1.5 mm and an extension length of 2.5 mm) and V-groove (a butt thickness of 1.0 mm and an angle of 60°) at the butt end and having a thickness of 9 mm, an outside diameter of 40 mm and a length of 50 mm.

Each ingot of the alloys F and M to P was hot-forged in the conventional manner and then subjected to cold working with repetitions of solution heat treatment before each cold working in order to obtain welding materials each in the form of a solid wire having a diameter of 2.0 mm or a wound wire having a diameter of 1.2 mm.

The thus-obtained tubular restraint weld cracking test specimens were peripherally restrained-welded with a rod inserted, as shown in FIG. 1; that is to say, using the said specimens, similar material welding (alloy I to alloy I and alloy E to alloy E) and dissimilar material welding (combinations of alloy I and alloy J, alloy I and alloy K, alloy I and alloy L, and alloy D and alloy E) were carried out in a peripherally restrained state.

Concretely, each butt site of U-grooves and V-grooves was subjected to a primary pass welding using any one of the above-mentioned welding materials F and M to P.

In the case of the V-groove welding, the welding was carried out by TIG welding under the following conditions: welding current of 100 A, welding voltage of 12 V, and welding speed of 8 cm/min. In the case of the U-groove welding, the welding was carried out by TIG welding under the following conditions: welding current of 110 A, welding voltage of 12 V, and welding speed of 8 cm/min. The ratio of dilution from base metals was varied by changing the groove shape, root gap and feeding speed of welding materials.

After the said primary pass welding by TIG welding, the weld bead surface in each tubular specimen was observed to determine whether solidification cracking occurred or not.

Furthermore, five samples for sectional microstructure observation of the welded joint were taken from each primary pass welded test specimen. After mirror-like polishing each surface of the said samples was examined to determine whether the solidification cracking occurred or not, using an optical microscope at a magnification of 500 times. After the said examination, the ratio of the area of the melted base metal portions to the area of the weld metal of the primary layer obtained by image analysis, namely the ratio "(area of the melted base metal portions)/(area of the weld metal of the primary layer)", was calculated for each sample in order to determine the average ratio of dilution from base metals of each said test specimen.

For each test specimen, the welding conditions, the average ratio of dilution from base metals, the occurrence or nonoccurrence of bead surface cracking and the incidence of weld solidification cracking in the said five samples for sectional microstructure observation are shown in Table 7.

TABLE 7

| Test specimen No. | Combination of base metals | Shape of grove | Welding material | Root gap (mm) | Average ratio of dilution from base metals (%) | Bead surface cracking | Weld solidification cracking (Number of cracking)/(Number of observed section) |
|---|---|---|---|---|---|---|---|
| 24 | I-I | U | M | 0 | 68 | occurred | 5/5 |
| 25 | I-I | U | P | 0 | 61 | free | 0/5 |
| 26 | I-I | V | M | 2 | 32 | occurred | 5/5 |
| 27 | I-I | V | N | 2 | 33 | free | 0/5 |
| 28 | I-I | V | P | 1 | 39 | free | 0/5 |
| 29 | I-J | U | N | 0 | 70 | occurred | 5/5 |
| 30 | I-J | U | P | 0 | 66 | free | 0/5 |
| 31 | I-J | V | O | 2 | 28 | free | 0/5 |
| 32 | I-J | V | P | 2 | 46 | free | 0/5 |
| 33 | I-K | U | M | 0 | 63 | occurred | 5/5 |
| 34 | I-K | U | P | 0 | 61 | free | 0/5 |
| 35 | I-K | V | O | 2 | 30 | free | 0/5 |
| 36 | I-K | V | P | 2 | 38 | free | 0/5 |
| 37 | I-L | U | N | 0 | 68 | occurred | 5/5 |
| 38 | I-L | U | P | 0 | 59 | free | 0/5 |
| 39 | I-L | V | O | 2 | 29 | free | 0/5 |
| 40 | I-L | V | P | 2 | 31 | free | 0/5 |
| 41 | D-E | U | F | 0 | 58 | free | 0/5 |
| 42 | D-E | V | F | 2 | 33 | free | 0/5 |
| 43 | E-E | U | F | 0 | 61 | free | 0/5 |
| 44 | E-E | V | F | 2 | 35 | free | 0/5 |

As is apparent from Table 7, the test specimens in Nos. 25, 27, 28, 30 to 32, 34 to 36 and 38 to 44 showed no bead surface cracking and no weld solidification cracking.

On the other hand, bead surface cracking was observed and the weld solidification cracking was also found in all test specimens in Nos. 24, 26, 29, 33 and 37.

From the results mentioned above, it is seen that the test specimens in Nos. 24, 26 and 33, which showed the ratios of dilution from base metals of 68%, 32% and 63%, respectively, failed to counteract the malignant influence of the inflow of P from the base metals and allowed solidification cracking to occur in the weld metal of the primary layer, irrespective of the ratio of dilution from base metals, since the C content of the alloy M, used as the welding material was 0.16% which was outside the lower limit of the C content range regulated by the present invention.

It is also seen that the test specimens in Nos. 29 and 37, which showed high ratios of dilution from base metals of 70% and 68% respectively, and therefore large amounts of inflow of P occurred, but the C content of the alloy N used as the welding material was as low as 0.29%; hence the said test specimens failed to counteract the malignant influence of the inflow of P from the base metals and allowed solidification cracking to occur in the weld metal of the primary layer. In the test specimen in No. 27 obtained by welding using the same alloy N as the welding material at a ratio of dilution from base metals of lower than 50%, the inflow of P was suppressed and no weld solidification cracking was observed.

Therefore, those welded joints produced by the primary pass welding under the same conditions as shown in the above-mentioned Table 7, which showed no weld solidification cracking in the weld metal of the primary layer, were subjected to build-up pass welding using the welding materials F and M to P in such a combination as shown in Tables 8 and 9 by the TIG welding under the following conditions: welding current of 130 A, welding voltage of 12 V, and welding speed of 10 cm/min.

For each build-up pass welded test specimen, the incidence of weld solidification cracking in the said five samples for sectional microstructure observation and the results of the said bend test are collectively shown in Tables 8 and 9. The mark "○" in the column "Result of bend test" in Tables 8 and 9 indicates that the 180°-bending was possible in each lateral bend test of the two samples and no crack opening was observed after the said bend test. On the other hand, the mark "Δ" indicates that the 180°-bending was possible in each lateral bend test of the two samples but crack openings, including microcracks, were observed after the said bend test.

TABLE 8

| Test specimen No. | Combination of base metals | Shape of grove | Welding material for primary pass welding | Root gap (mm) | Average ratio of dilution from base metals (%) | Welding material for build-up pass welding | Weld solidification cracking (Number of cracking)/(Number of observed section) | Bend test result |
|---|---|---|---|---|---|---|---|---|
| 25-1 | I-I | U | P | 0 | 61 | M | 4/5 | x |
| 25-2 | I-I | U | P | 0 | 61 | N | 0/5 | ○ |
| 25-3 | I-I | U | P | 0 | 61 | O | 0/5 | ○ |
| 25-4 | I-I | U | P | 0 | 61 | P | 0/5 | Δ |
| 27-1 | I-I | V | N | 2 | 33 | O | 0/5 | ○ |
| 27-2 | I-I | V | N | 2 | 33 | P | 0/5 | Δ |
| 28-1 | I-I | V | P | 1 | 39 | M | 3/5 | x |
| 28-2 | I-I | V | P | 1 | 39 | O | 0/5 | ○ |
| 28-3 | I-I | V | P | 1 | 39 | P | 0/5 | Δ |
| 30-1 | I-J | U | P | 0 | 66 | N | 0/5 | ○ |
| 30-2 | I-J | U | P | 0 | 66 | O | 0/5 | ○ |
| 30-3 | I-J | U | P | 0 | 66 | P | 0/5 | Δ |
| 31-1 | I-J | V | O | 2 | 28 | O | 0/5 | ○ |
| 31-2 | I-J | V | O | 2 | 28 | P | 0/5 | Δ |
| 32-1 | I-J | V | P | 2 | 46 | N | 0/5 | ○ |
| 32-2 | I-J | V | P | 2 | 46 | P | 0/5 | Δ |
| 34-1 | I-K | U | P | 0 | 61 | M | 4/5 | x |
| 34-2 | I-K | U | P | 0 | 61 | P | 0/5 | Δ |
| 35-1 | I-K | V | O | 2 | 30 | N | 0/5 | ○ |
| 35-2 | I-K | V | O | 2 | 30 | O | 0/5 | ○ |

TABLE 9

| Test specimen No. | Combination of base metals | Shape of grove | Welding material for primary pass welding | Root gap (mm) | Average ratio of dilution from base metals (%) | Welding material for build-up pass welding | Weld solidification cracking (Number of cracking)/(Number of observed section) | Bend test result |
|---|---|---|---|---|---|---|---|---|
| 36-1 | I-K | V | P | 2 | 38 | O | 0/5 | ○ |
| 36-2 | I-K | V | P | 2 | 38 | P | 0/5 | Δ |
| 38-1 | I-L | U | P | 0 | 59 | M | 4/5 | x |
| 38-2 | I-L | U | P | 0 | 59 | O | 0/5 | ○ |
| 38-3 | I-L | U | P | 0 | 59 | P | 0/5 | Δ |
| 39-1 | I-L | V | O | 2 | 29 | O | 0/5 | ○ |
| 39-2 | I-L | V | O | 2 | 29 | P | 0/5 | Δ |
| 40-1 | I-L | V | P | 2 | 31 | O | 0/5 | ○ |
| 40-2 | I-L | V | P | 2 | 31 | P | 0/5 | Δ |
| 41-1 | D-E | U | F | 0 | 58 | F | 0/5 | Δ |
| 41-2 | D-E | U | F | 0 | 58 | O | 0/5 | ○ |
| 42-1 | D-E | V | F | 2 | 33 | F | 0/5 | Δ |
| 42-2 | D-E | V | F | 2 | 33 | O | 0/5 | ○ |
| 43-1 | E-E | U | F | 0 | 61 | F | 0/5 | Δ |
| 43-2 | E-E | U | F | 0 | 61 | O | 0/5 | ○ |
| 44-1 | E-E | V | F | 2 | 35 | F | 0/5 | Δ |
| 44-2 | E-E | V | F | 2 | 35 | O | 0/5 | ○ |

Five samples for sectional microstructure observation of the welded joint were taken from each build-up pass welded test specimen. After mirror-like polishing each build-up pass welded portion of the said samples was examined to determine whether the solidification cracking occurred or not, using an optical microscope at a magnification of 500 times. Further, two samples having a 3-mm-thick for a lateral bend test were taken from each welded joint test specimen showing no weld solidification cracking in the build-up pass welded portion and were subjected to a bend test at a bending radius of R of 6 mm.

Further, the mark "x" indicates that, in at least one of the two samples, the 180°-bending was impossible in the lateral bend test and breakage occurred during the said bend test.

As can be seen from Tables 8 and 9, no weld solidification cracking was observed in the build-up pass welded portion, the results of the bend test were good, the 180°-bending could be performed and no crack opening was found after the said bend test in the said test specimens in Nos. 25-2, 25-3, 27-1, 28-2, 30-1, 30-2, 31-1, 32-1, 35-1, 35-2, 36-1, 38-2, 39-1, 40-1, 41-2, 42-2, 43-2 and 44-2.

On the contrary, it was revealed that, in the case of the test specimens in Nos. 25-1, 28-1, 34-1 and 38-1, where the C content of the alloy M, used as the welding material in the build-up pass welding was as low as 0.16% and outside the C content range regulated herein for all welding materials according to the present invention, the malignant influence of the inflow of P could not be counteracted, therefore weld solidification cracking occurred in the build-up pass welded portion. Furthermore, crack openings accompanying the weld solidification cracking were found in the bend testing, and the results of the said bend test were also inferior.

It was further found that, in the case of the test specimens in Nos. 25-4, 27-2, 28-3, 30-3, 31-2, 32-2, 34-2, 36-2, 38-3, 39-2 and 40-2, where the C content of the welding material P, used as the build-up pass welding material was higher than the range regulated herein according to the present inventions (7) to (10), the amounts of eutectic carbide precipitates formed in the build-up pass welded portion increased and, as a result, the ductility deteriorated, giving inferior results in the said bend test.

Similarly, it was also revealed that, in the case of the test specimens in Nos. 41-1, 42-1, 43-1 and 44-1, where the C content of the welding material F, used as the build-up pass welding material was higher than the amounts regulated herein according to the present inventions (10) to (12), the amounts of eutectic carbide precipitates formed in the build-up pass welded portion increased and, as a result, the ductility deteriorated, giving inferior results in the said bend test.

INDUSTRIAL APPLICABILITY

The welding materials of the present invention, in spite of at least one of the base metals has a high P content of more than 0.03% to not more than 0.3% and shows fully austenitic solidification, can suppress weld solidification cracking; therefore, they can be widely used in such fields where a welding fabrication is required. Furthermore, the welded joint structures of the present invention, in spite of at least one of the base metals has a high P content mentioned above and shows fully austenitic solidification, are excellent in weld solidification cracking resistance or in both weld solidification cracking resistance and ductility. In addition, the welded joint structures of the present invention also have excellent high temperature strength and corrosion resistance. The welding materials of the present invention are best suited for producing the above-mentioned austenitic alloy welded joint structures.

What is claimed is:

1. A welding material to be used for welding a base metal made of an austenitic alloy having the following "chemical composition 1" to a base metal made of another austenitic alloy, comprising:
by mass percent, C: 0.8 to 3.0%, Si: not more than 4.0%, Mn: not more than 3.0%, P: not more than 0.03%, S: not more than 0.03%, Cr: more than 22% to not more than 55%, Ni: more than 30% to not more than 70%, sol. Al: 0.001 to 1% and N: not more than 0.3%, with the balance being Fe and impurities:
"Chemical composition 1": a chemical composition which comprises, by mass percent, C: not more than 2.0%, Si: not more than 4.0%, Mn: 0.01 to 3.0%, P: more than 0.03% to not more than 0.3%, S: not more than 0.03%, Cr: 12 to 35%, Ni: 6 to 80%, sol. Al: 0.001 to 5% and N: not more than 0.3%, with the balance being Fe and impurities.

2. The welding material according to claim 1, in which the base metal made of the another austenitic alloy has the following "chemical composition 1":
"Chemical composition 1": a chemical composition which comprises, by mass percent, C: not more than 2.0%, Si: not more than 4.0%, Mn: 0.01 to 3.0%, P: more than 0.03% to not more than 0.3%, S: not more than 0.03%, Cr: 12 to 35%, Ni: 6 to 80%, sol. Al: 0.001 to 5% and N: not more than 0.3%, with the balance being Fe and impurities.

3. The welding material according to claim 1, in which one or more alloys among the base metals and welding material contain one or more elements selected from the first group given below in lieu of a part of Fe, by mass percent:
first group: Cu: not more than 5%, Mo: not more than 10%, W: not more than 10%, V: not more than 2%, Nb: not more than 3%, Ti: not more than 3%, Ta: not more than 8%, Zr: not more than 1%, Hf: not more than 1%, Co: not more than 15% and B: not more than 0.03%.

4. The welding material according to claim 2, in which one or more alloys among the base metals and welding material contain one or more elements selected from the first group given below in lieu of a part of Fe, by mass percent:
first group: Cu: not more than 5%, Mo: not more than 10%, W: not more than 10%, V: not more than 2%, Nb: not more than 3%, Ti: not more than 3%, Ta: not more than 8%, Zr: not more than 1%, Hf: not more than 1%, Co: not more than 15% and B: not more than 0.03%.

5. A welded joint structure in which a base metal made of an austenitic alloy having the following "chemical composition 11" is welded to a base metal made of another austenitic alloy by using the welding material comprising, by mass percent, C: more than 0.3% to not more than 3.0%, Si: not more than 4.0%, Mn: not more than 3.0%, P: not more than 0.03%, S: not more than 0.03%, Cr: more than 22% to not more than 55%, Ni: more than 30% to not more than 70%, sol. Al: 0.001 to 1% and N: not more than 0.3%, with the balance being Fe and impurities:
"Chemical composition 11": a chemical composition which comprises, by mass percent, C: not more than 2.0%, Si: not more than 4.0%, Mn: 0.01 to 3.0%, P: more than 0.08% to not more than 0.3%, S: not more than 0.03%, Cr: 12 to 35%, Ni: 6 to 80%, sol. Al: 0.001 to 5% and N: not more than 0.3%, with the balance being Fe and impurities.

6. The welded joint structure according to claim 5 in which the base metal made of the another austenitic alloy has the following "chemical composition 11"
"Chemical composition 11": a chemical composition which comprises, by mass percent, C: not more than 2.0%, Si: not more than 4.0%, Mn: 0.01 to 3.0%, P: more than 0.08% to not more than 0.3%, S: not more than 0.03%, Cr: 12 to 35%, Ni: 6 to 80%, sol. Al: 0.001 to 5% and N: not more than 0.3%, with the balance being Fe and impurities.

7. The welded joint structure according to claim 5, in which one or more alloys among the base metals and welding material contain one or more elements selected from the first group given below in lieu of a part of Fe, by mass percent:
first group: Cu: not more than 5%, Mo: not more than 10%, W: not more than 10%, V: not more than 2%, Nb: not more than 3%, Ti: not more than 3%, Ta: not more than 8%, Zr: not more than 1%, Hf: not more than 1%, Co: not more than 15% and B: not more than 0.03%.

8. The welded joint structure according to claim 6, in which one or more alloys among the base metals and welding material contain one or more elements selected from the first group given below in lieu of a part of Fe, by mass percent:

first group: Cu: not more than 5%, Mo: not more than 10%, W: not more than 10%, V: not more than 2%, Nb: not more than 3%, Ti: not more than 3%, Ta: not more than 8%, Zr: not more than 1%, Hf: not more than 1%, Co: not more than 15% and B: not more than 0.03%.

9. A welded joint structure which is constructed with base metals each made of an austenitic alloy comprising, by mass percent, C: not more than 2.0%, Si: not more than 4.0%, Mn: 0.01 to 3.0%, P: more than 0.08% to not more than 0.3%, S: not more than 0.03%, Cr: 12 to 35%, Ni: 6 to 80%, sol. Al: 0.001 to 5% and N: not more than 0.3%, with the balance being Fe and impurities, and a weld metal made of an austenitic alloy having the following characteristics (i) and (ii):

(i) the chemical composition of at least the primary layer being welded from one side, comprises, by mass percent, C: more than 0.1% to not more than 0.7%, Si: not more than 4.0%, Mn: not more than 3.0%, P: more than 0.03% to not more than 0.1%, S: not more than 0.03%, Cr: 18 to 30%, Ni: more than 10% to not more than 70%, sol. Al: 0.001 to 1% and N: not more than 0.3%, with the balance being Fe and impurities; and (ii) the penetration bead has a height of 0 to 3 mm.

10. The welded joint structure according to claim 9, in which one or more alloys among the base metals and weld metal contain one or more elements selected from the first group given below in lieu of a part of Fe, by mass percent:

first group: Cu: not more than 5%, Mo: not more than 10%, W: not more than 10%, V: not more than 2%, Nb: not more than 3%, Ti: not more than 3%, Ta: not more than 8%, Zr: not more than 1%, Hf: not more than 1%, Co: not more than 15% and B: not more than 0.03%.

11. A welded joint structure resulting from welding of a base metal made of an austenitic alloy having the following "chemical composition 11" to a base metal made of another austenitic alloy, on the occasion of welding, a welding material which comprises, by mass percent, C: more than 0.6% to not more than 2.0%, Si: not more than 4.0%, Mn: not more than 3.0%, P: not more than 0.03%, S: not more than 0.03%, Cr: more than 22% to not more than 35%, Ni: more than 30% to not more than 70%, sol. Al: 0.001 to 1% and N: not more than 0.3%, with the balance being Fe and impurities, is used in the primary pass of the multi-layer welding and a welding material which comprises, by mass percent, C: more than 0.2% to not more than 0.6%, Si: not more than 4.0%, Mn: not more than 3.0%, P: not more than 0.03%, S: not more than 0.03%, Cr: more than 22% to not more than 35%, Ni: more than 30% to not more than 70%, sol. Al: 0.001 to 1% and N: not more than 0.3%, with the balance being Fe and impurities, is used in the subsequent build-up passes of the said multi-layer welding:

"Chemical composition 11": a chemical composition which comprises, by mass percent, C: not more than 2.0%, Si: not more than 4.0%, Mn: 0.01 to 3.0%, P: more than 0.08% to not more than 0.3%, S: not more than 0.03%, Cr: 12 to 35%, Ni: 6 to 80%, sol. Al: 0.001 to 5% and N: not more than 0.3%, with the balance being Fe and impurities.

12. The welded joint structure according to claim 11, in which the base metal made of the another austenitic alloy has the following "chemical composition 11":

"Chemical composition 11": a chemical composition which comprises, by mass percent, C: not more than 2.0%, Si: not more than 4.0%, Mn: 0.01 to 3.0%, P: more than 0.08% to not more than 0.3%, S: not more than 0.03%, Cr: 12 to 35%, Ni: 6 to 80%, sol. Al: 0.001 to 5% and N: not more than 0.3%, with the balance being Fe and impurities.

13. The welded joint structure according to claim 11, in which one or more alloys among the base metals and welding material contain one or more elements selected from the first group given below in lieu of a part of Fe, by mass percent:

first group: Cu: not more than 5%, Mo: not more than 10%, W: not more than 10%, V: not more than 2%, Nb: not more than 3%, Ti: not more than 3%, Ta: not more than 8%, Zr: not more than 1%, Hf: not more than 1%, Co: not more than 15% and B: not more than 0.03%.

14. The welded joint structure according to claim 12, in which one or more alloys among the base metals and welding material contain one or more elements selected from the first group given below in lieu of a part of Fe, by mass percent:

first group: Cu: not more than 5%, Mo: not more than 10%, W: not more than 10%, V: not more than 2%, Nb: not more than 3%, Ti: not more than 3%, Ta: not more than 8%, Zr: not more than 1%, Hf: not more than 1%, Co: not more than 15% and B: not more than 0.03%.

15. A welded joint structure resulting from welding of a base metal made of an austenitic alloy having the following "chemical composition 11" to a base metal made of another austenitic alloy, on the occasion of welding, using a welding material which comprises by mass percent, C: more than 0.2% to not more than 0.6%, Si: not more than 4.0%, Mn: not more than 3.0%, P: not more than 0.03%, S: not more than 0.03%, Cr: more than 22% to not more than 35%, Ni: more than 30% to not more than 70%, sol. Al: 0.001 to 1% and N: not more than 0.3%, with the balance being Fe and impurities, at least the welding of the primary layer is carried out under a condition such that the ratio of dilution from the base metals becomes less than 50%:

"Chemical composition 11": a chemical composition which comprises, by mass percent, C: not more than 2.0%, Si: not more than 4.0%, Mn: 0.01 to 3.0%, P: more than 0.08% to not more than 0.3%, S: not more than 0.03%, Cr: 12 to 35%, Ni: 6 to 80%, sol. Al: 0.001 to 5% and N: not more than 0.3%, with the balance being Fe and impurities.

16. The welded joint structure according to claim 15, in which the base metal made of the another austenitic alloy has the following "chemical composition 11":

"Chemical composition 11": a chemical composition which comprises, by mass percent, C: not more than 2.0%, Si: not more than 4.0%, Mn: 0.01 to 3.0%, P: more than 0.08% to not more than 0.3%, S: not more than 0.03%, Cr: 12 to 35%, Ni: 6 to 80%, sol. Al: 0.001 to 5% and N: not more than 0.3%, with the balance being Fe and impurities.

17. The welded joint structure according to claim 15, in which one or more alloys among the base metals and welding material contain one or more elements selected from the first group given below in lieu of a part of Fe, by mass percent:

first group: Cu: not more than 5%, Mo: not more than 10%, W: not more than 10%, V: not more than 2%, Nb: not more than 3%, Ti: not more than 3%, Ta: not more than 8%, Zr: not more than 1%, Hf: not more than 1%, Co: not more than 15% and B: not more than 0.03%.

18. The welded joint structure according to claim 16, in which one or more alloys among the base metals and welding material contain one or more elements selected from the first group given below in lieu of a part of Fe, by mass percent:

first group: Cu: not more than 5%, Mo: not more than 10%, W: not more than 10%, V: not more than 2%, Nb: not more than 3%, Ti: not more than 3%, Ta: not more than 8%, Zr: not more than 1%, Hf: not more than 1%, Co: not more than 15% and B: not more than 0.03%.

* * * * *